(12) United States Patent
Honeycutt

(10) Patent No.: US 8,225,465 B2
(45) Date of Patent: Jul. 24, 2012

(54) HEADSET CORD HOLDER

(75) Inventor: Rob Honeycutt, Berkeley, CA (US)

(73) Assignee: Snik LLC, Berkeley, CA (US)

( * ) Notice: Subject to any disclaimer, the term of this patent is extended or adjusted under 35 U.S.C. 154(b) by 179 days.

(21) Appl. No.: 12/699,713

(22) Filed: Feb. 3, 2010

(65) Prior Publication Data

US 2010/0170066 A1 Jul. 8, 2010

Related U.S. Application Data

(63) Continuation-in-part of application No. 12/692,477, filed on Jan. 22, 2010, which is a continuation-in-part of application No. 12/291,740, filed on Nov. 12, 2008.

(60) Provisional application No. 61/133,487, filed on Jun. 27, 2008.

(51) Int. Cl.
*A44B 19/24* (2006.01)
*A44B 19/02* (2006.01)
*A44B 19/08* (2006.01)

(52) U.S. Cl. ................ 24/405; 24/429; 24/413

(58) Field of Classification Search ............ 24/429, 24/431, 403–405, 413
See application file for complete search history.

(56) References Cited

U.S. PATENT DOCUMENTS

| | | | | |
|---|---|---|---|---|
| 3,753,201 A | * | 8/1973 | Ohman | 338/92 |
| 4,562,621 A | * | 1/1986 | Takeshima et al. | 24/408 |
| 4,901,355 A | | 2/1990 | Moore | |
| 5,511,292 A | * | 4/1996 | Covi et al. | 24/410 |
| 5,671,508 A | | 9/1997 | Murai | |
| 5,713,110 A | * | 2/1998 | Covi et al. | 24/431 |
| 6,431,500 B1 | | 8/2002 | Jacobs et al. | |
| 6,526,635 B2 | | 3/2003 | Nasu et al. | |
| D479,978 S | | 9/2003 | Watabe et al. | |
| D480,942 S | | 10/2003 | Ishida et al. | |
| 7,416,099 B2 | | 8/2008 | deLeon et al. | |
| 7,519,192 B1 | * | 4/2009 | Laycock et al. | 381/301 |
| 7,559,123 B1 | | 7/2009 | Yang | |
| D636,756 S | | 4/2011 | Fahrendorff et al. | |
| 2003/0074712 A1 | | 4/2003 | Liao | |
| 2004/0107887 A1 | | 6/2004 | Kinkead | |
| 2004/0204208 A1 | | 10/2004 | Thompson | |

(Continued)

FOREIGN PATENT DOCUMENTS

| DE | 102007015828 A1 | 10/2008 |
|---|---|---|
| JP | 2002-330803 | 11/2002 |
| JP | 2004214996 A1 | 7/2004 |

(Continued)

OTHER PUBLICATIONS

Declaration of Rob Honeycutt, executed on Oct. 7, 2010.

*Primary Examiner* — Robert J Sandy
*Assistant Examiner* — Matthew Sullivan
(74) *Attorney, Agent, or Firm* — Haverstock & Owens LLP

(57) ABSTRACT

A headset cord holder comprises a body and a first groove built into the body configured to receive and releasably hold a headset cord. In some embodiments, the first groove has a diameter less than or equal to approximately 2 mm. In further embodiments, the body is integrally formed within the teeth of a zipper. In some embodiments the body comprises one or more of rubber, plastic and metal. In some embodiments, the body comprises one or more of stamped metal and molded metal. In further embodiments, the body comprises molded plastic. In some embodiments, the body comprises one or more additional grooves configured to receive and releasably secure the headset cord.

24 Claims, 20 Drawing Sheets

| U.S. PATENT DOCUMENTS | | | | FOREIGN PATENT DOCUMENTS | | |
|---|---|---|---|---|---|---|
| 2005/0248717 A1 | 11/2005 | Howell et al. | | JP | 2006-336803 | 12/2006 |
| 2006/0059666 A1 | 3/2006 | Senink | | JP | 1305823 | 7/2007 |
| 2007/0086617 A1 | 4/2007 | Loh | | JP | 2008-55050 | 3/2008 |
| 2007/0160249 A1 | 7/2007 | LeGette et al. | | JP | 3141560 | 4/2008 |
| 2008/0029288 A1 | 2/2008 | Chen et al. | | WO | 02/080714 A1 | 10/2002 |
| 2008/0123258 A1 | 5/2008 | Singh | | WO | 03/103255 A1 | 12/2003 |
| 2008/0289151 A1 | 11/2008 | Chan | | WO | 2004/107887 A1 | 12/2004 |
| 2009/0320247 A1 | 12/2009 | Honeycutt | | | | |
| 2010/0275418 A1 | 11/2010 | Ingram | | | | |

* cited by examiner

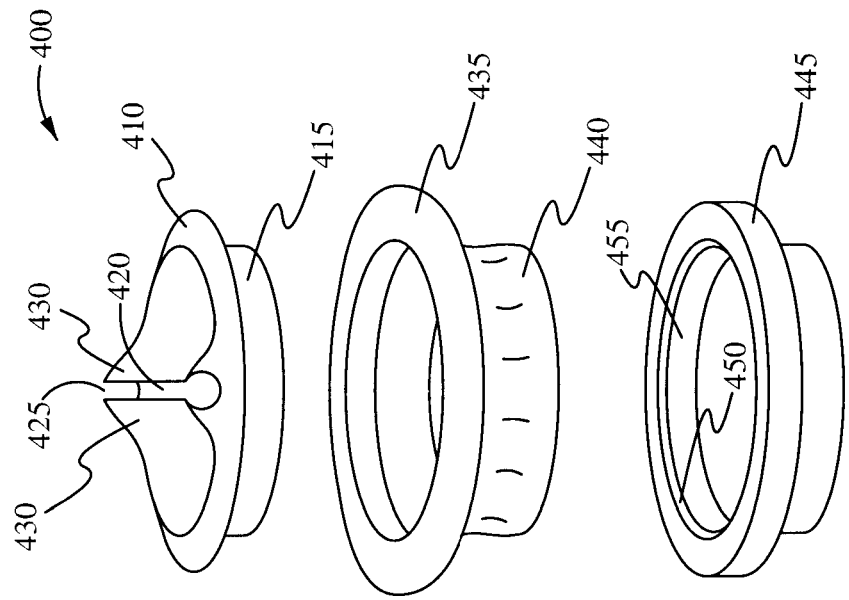
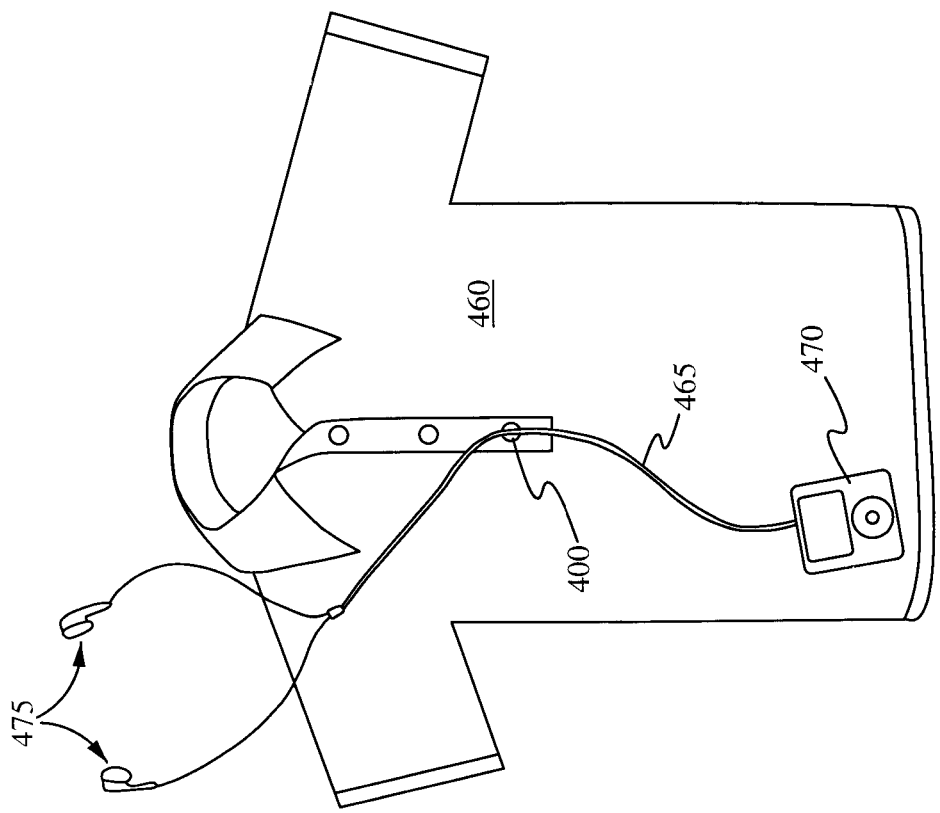
Fig. 4B
Fig. 4A

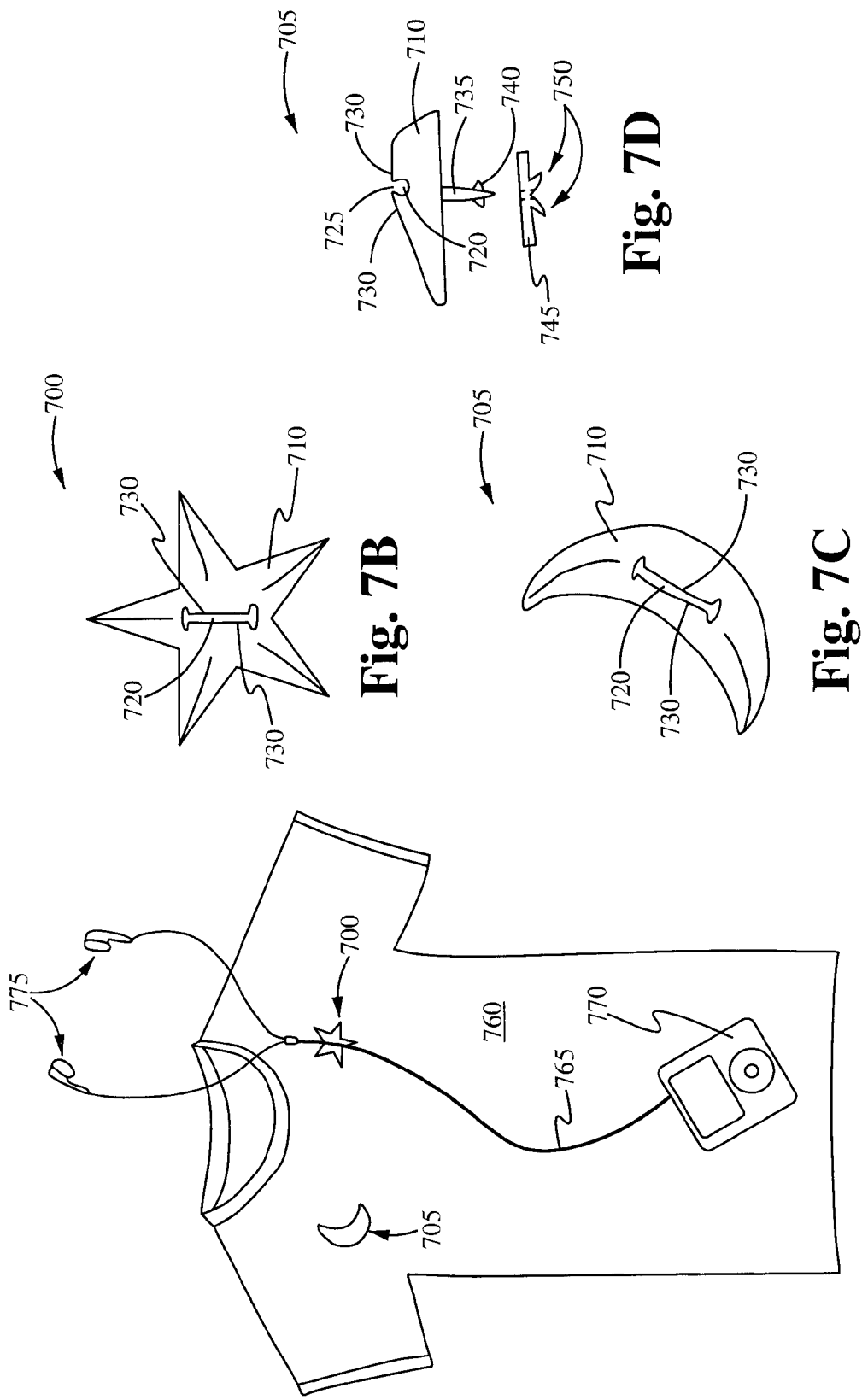

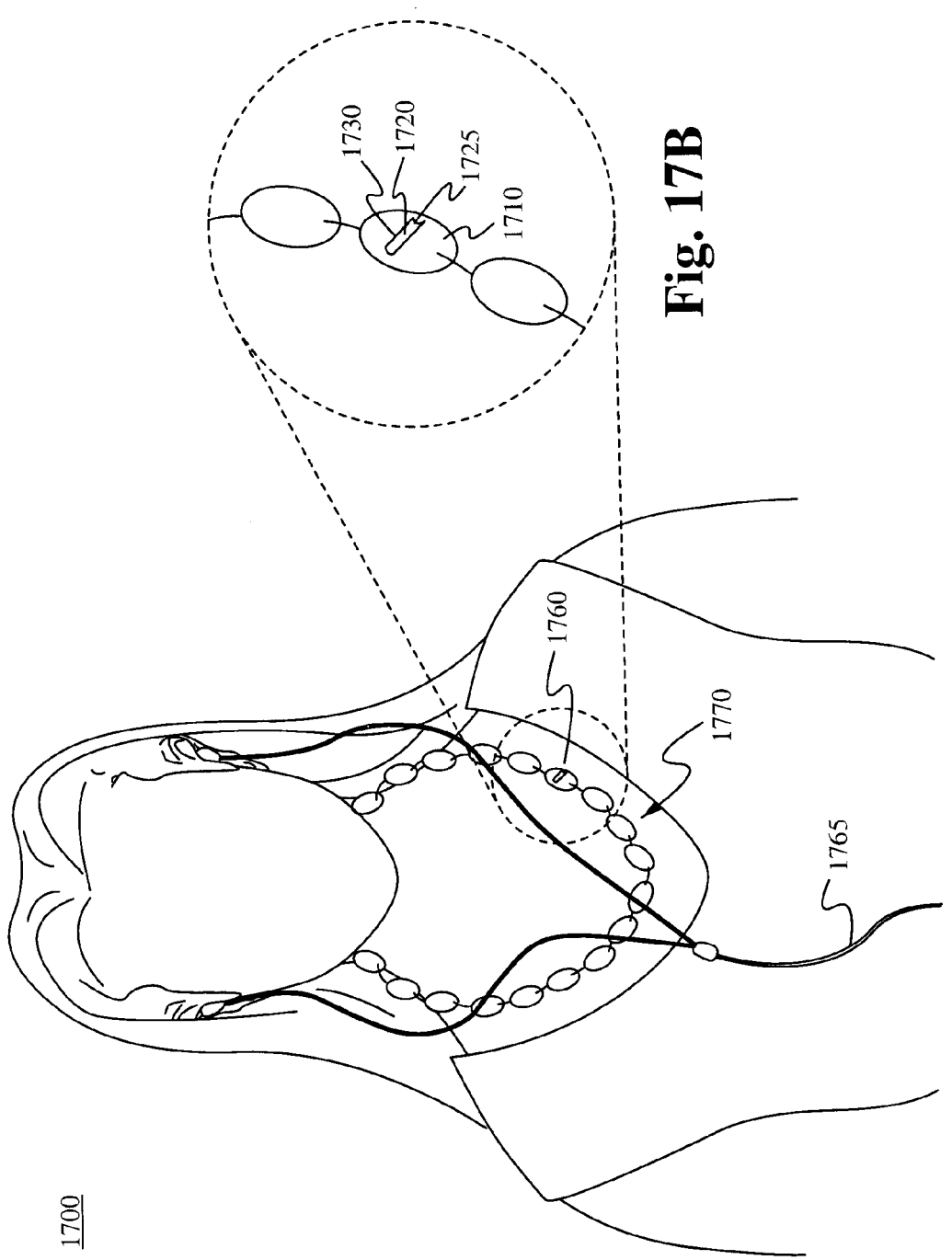

HEADSET CORD HOLDER

CROSS-REFERENCE TO RELATED APPLICATIONS

This patent application is a continuation-in-part of the co-pending U.S. patent application Ser. No. 12/692,477 filed Jan. 22, 2010, and entitled "HEADSET CORD HOLDER", which is hereby incorporated by reference in its entirety, which is a continuation-in-part of the co-pending U.S. patent application Ser. No. 12/291,740, filed Nov. 12, 2008, and entitled "HEADSET CORD HOLDER," which is hereby incorporated by reference in its entirety, which claims priority to the U.S. Provisional Application Ser. No. 61/133,487, filed Jun. 27, 2008, entitled "HEADSET CORD HOLDER," which is hereby incorporated by reference in its entirety.

FIELD OF THE INVENTION

The present invention relates to cord holders. More particularly, the present invention relates to a cord holder used to affix a headset cord to clothing and bags.

BACKGROUND OF THE INVENTION

Headset cords transmit signals from a source device, such as a music player or cell phone, to earphones being worn by a user. Although these cords are typically flexible and can be maneuvered out of the way by the user, such manipulation by the user can be inconvenient, and often inefficient, as the cords regularly find their way back into an undesired location.

SUMMARY OF THE INVENTION

The present application is directed towards a headset cord holder used to affix a headset cord to clothing and/or other items. Any headset cord is able to be affixed, including a cord for an iPod, iPhone, or any other similar cell phone or MP3 or music player. The cord holder comprises a simple groove that is the diameter of a standard earphone cord but has an opening tight enough to hold the cord in place when it is pushed into the groove. This groove is able to be designed into or molded into a variety of items, including the teeth or handle of a zipper, that can be sewn to, pinned to, or clipped to clothing, bags and other items.

A first aspect of the present application is directed to a headset cord holder. The headset cord holder comprises a plurality of zipper teeth each having a body and a first groove built into one or more of the bodies configured to receive and releasably hold a cord. In some embodiments, the first groove has a diameter less than or equal to approximately 2 mm. In some embodiments, each body comprises one or more of rubber, plastic or metal. In some embodiments, each body comprises one or more of stamped metal or molded metal. Alternatively, each body comprises molded plastic. In some embodiments, each body comprises one or more additional grooves configured to receive and releasably secure the headset cord. In some embodiments, the one or more additional grooves each have a different diameter. In some embodiments, the teeth comprise a first portion and a second portion, wherein each first body of the first portion has a first groove of a first diameter and each second body of the second portion has a second groove of a second diameter.

Another aspect of the present application is directed to a headset cord holder. The headset cord holder comprises a plurality of zipper teeth each having a body and a first groove built into one or more of the bodies configured to receive and releasably hold a cord, wherein the first groove within each body is aligned when the zipper teeth are zipped together. In some embodiments, the first groove has a diameter less than or equal to approximately 2 mm. In some embodiments, each body comprises one or more of rubber, plastic or metal. In some embodiments, each body comprises one or more of stamped metal or molded metal. Alternatively, each body comprises molded plastic. In some embodiments, each body comprises one or more additional grooves configured to receive and releasably secure the headset cord. In some embodiments, the one or more additional grooves each have a different diameter. In some embodiments, the teeth comprise a first portion and a second portion, wherein each first body of the first portion has a first groove of a first diameter and each second body of the second portion has a second groove of a second diameter.

Yet another aspect of the present application is directed to a headset cord holder. The headset cord holder comprises a plurality of zipper teeth each having a body and a first groove built into one or more of the bodies configured to receive and releasably hold a cord, wherein the first groove within each body is aligned when the zipper teeth are zipped together, and the first groove within every other body is aligned when the zipper teeth are unzipped. In some embodiments, the first groove has a diameter less than or equal to approximately 2 mm. In some embodiments, each body comprises one or more of rubber, plastic or metal. In some embodiments, each body comprises one or more of stamped metal or molded metal. Alternatively, each body comprises molded plastic. In some embodiments, each body comprises one or more additional grooves configured to receive and releasably secure the headset cord. In some embodiments, the one or more additional grooves each have a different diameter. In some embodiments, the teeth comprise a first portion and a second portion, wherein each first body of the first portion has a first groove of a first diameter and each second body of the second portion has a second groove of a second diameter.

BRIEF DESCRIPTION OF THE DRAWINGS

FIGS. 4A-B illustrate one embodiment of a headset cord holder having a groove molded into the surface of a plastic shirt snap in accordance with the principles of the present invention.

FIGS. 7A-D illustrate embodiments of a headset cord holder having a groove molded onto an adornment in accordance with the principles of the present invention.

FIG. 17A illustrates an embodiment of a headset cord having a groove molded into a piece of jewelry in accordance with some embodiments.

FIG. 17B illustrates a close-up view of an embodiment of a headset cord having a groove molded into a piece of jewelry in accordance with some embodiments.

DETAILED DESCRIPTION OF THE INVENTION

Figure 1A:
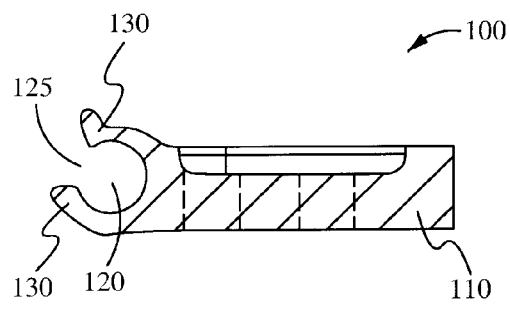
FIGS. 1A-D illustrate one embodiment of a headset cord holder having a groove molded into a shirt button in accordance with the principles of the present invention.
Figure 1B:
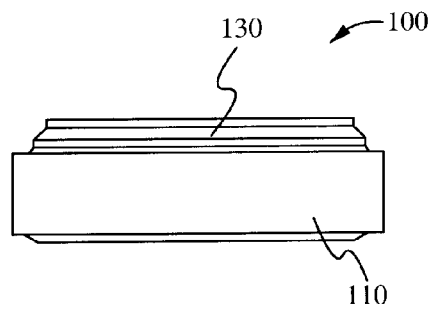
Figure 1C:
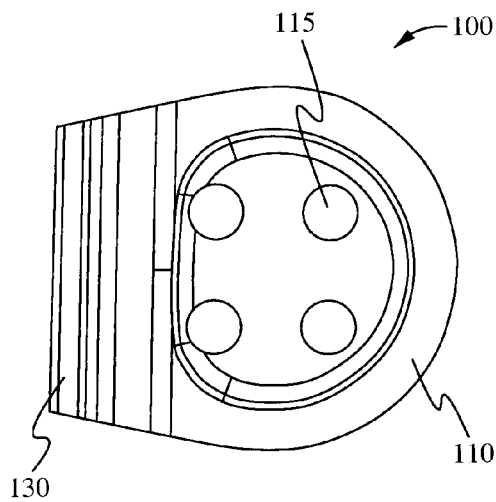
Figure 1D:
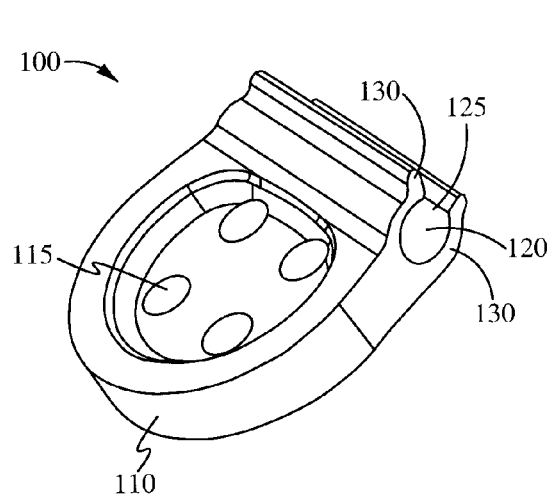
Figure 2A:
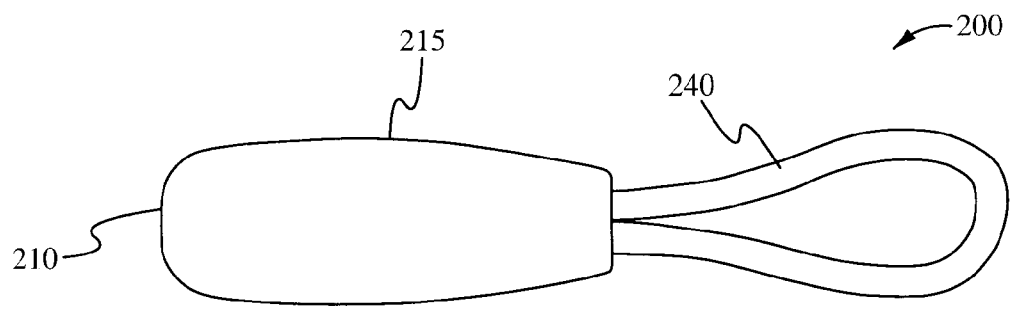
FIGS. 2A-D illustrate one embodiment of a headset cord holder having a groove molded into a zipper puller in accordance with the principles of the present invention.
Figure 2B:
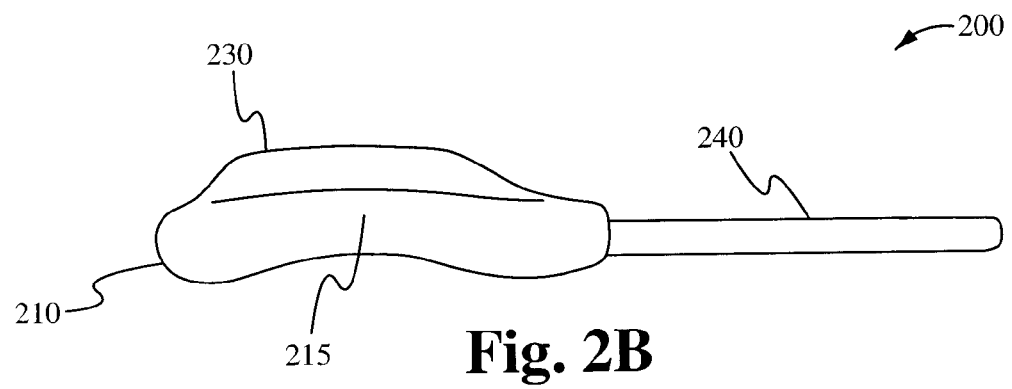
Figure 2C:
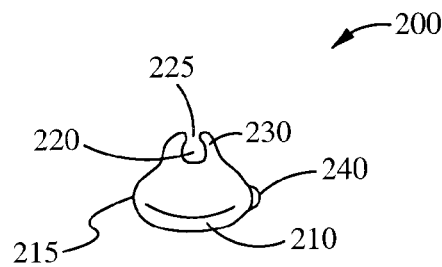
Figure 2D:
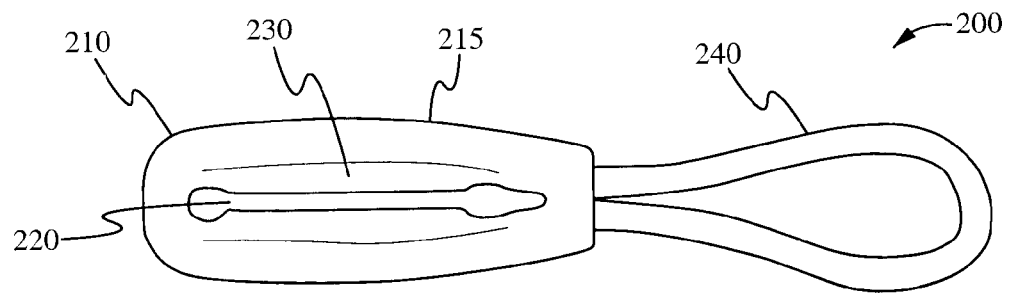

The description below concerns several embodiments of the invention. The discussion references the illustrated preferred embodiment. However, the scope of the present invention is not limited to either the illustrated embodiment, nor is it limited to those discussed, to the contrary, the scope should be interpreted as broadly as possible based on the language of the Claims section of this document.

This disclosure provides several embodiments of the present invention. It is contemplated that any features from any embodiment can be combined with any features from any other embodiment. In this fashion, hybrid configurations of the illustrated embodiments are well within the scope of the present invention.

FIGS. 1A-D illustrate one embodiment of a headset cord holder 100 having a groove 120 molded into the body 110 of a shirt button in accordance with the principles of the present invention. FIGS. 1A-D show a side view, front view, plan view, and perspective view of the cord holder 100, respectively.

The body 110 is configured to be coupled to a shirt, or another item of clothing, in the place of a standard button. In some embodiments, one or more apertures 115 are formed in the body 110 and used to sew, or otherwise affix, the body 110 of the cord holder 100 to an item of clothing. In some embodiments, the body 110 is configured to act as a closure mechanism capable of releasably coupling a first portion of the item of clothing to a second portion of the article of clothing. For example, in some embodiments, the body 110 is coupled to a dress shirt in a location opposite and corresponding to a hole in the center front placket, thereby allowing the body 110 to mate with the hole and securely close that portion of the shirt.

A groove 120 is molded or otherwise built into the body 110. The groove 120 is configured to receive and releasably secure a headset cord. In some embodiments, the groove 120 is defined by a groove wall 130 that surrounds most of the groove 120, leaving only an entry space 125 through which the cord can access the groove 120. In some embodiments, the entry space 125 has a smaller diameter than the groove 120 and the cord, thereby securing the cord within the confines of the groove wall 130 and requiring a significant amount of force for its removal. In some embodiments, portions of the groove wall 130 are flexible so that as the cord is pushed through the entry space 125, the cord is able to force the groove wall 130 out of its way and temporarily increase the diameter of the entry space 125 so that the cord can pass through the entry space 125 into the groove 120. In some embodiments, the groove wall 130 is substantially rigid, thereby forcing the outer sleeve of the cord to constrict as it passes through the entry space 125 between the ends of the groove wall 130.

FIGS. 2A-D illustrate one embodiment of a headset cord holder 200 having a groove molded into the body 210 of a zipper puller in accordance with the principles of the present invention. FIGS. 2A-D show a bottom view, side view, front view, and plan view of the cord holder 200, respectively.

The body 210 is configured to be coupled to a bag or an item of clothing, such as a shirt, in the place of a standard zipper. In some embodiments, the body 210 is configured to act as a closure mechanism capable of releasably coupling a first portion of the bag or item of clothing to a second portion of the bag or article of clothing. For example, in some embodiments, the body 210 comprises a channel (not shown) formed in opposing sidewalls 215 in order to receive and releasably couple together zipper tracks of the first portion and the second portion. In some embodiments, a puller 240 is coupled to the body 210 in order to facilitate the translation of the body 210 along the portions of the bag or item of clothing to which it is attached. In some embodiments, the puller 240 comprises a string loop, as shown in FIGS. 2A-D. In some embodiments, the puller 240 comprises a standard metal or plastic puller (not shown).

A groove 220 is molded or otherwise built into the body 210. The groove 220 is configured to receive and releasably secure a headset cord. In some embodiments, the groove 220 is defined by a groove wall 230 that surrounds most of the groove 220, leaving only an entry space 225 through which the cord can access the groove 220. In some embodiments, the entry space 225 has a smaller diameter than the groove 220 and the cord, thereby securing the cord within the confines of the groove wall 230 and requiring a significant amount of force for its removal. In some embodiments, portions of the groove wall 230 are flexible so that as the cord is pushed through the entry space 225, the cord is able to force the groove wall 230 out of its way and temporarily increase the diameter of the entry space 225 so that the cord can pass through the entry space 225 into the groove 220. In some embodiments, the groove wall 230 is substantially rigid, thereby forcing the outer sleeve of the cord to constrict as it passes through the entry space 225 between the ends of the groove wall 230.

Figure 3A:
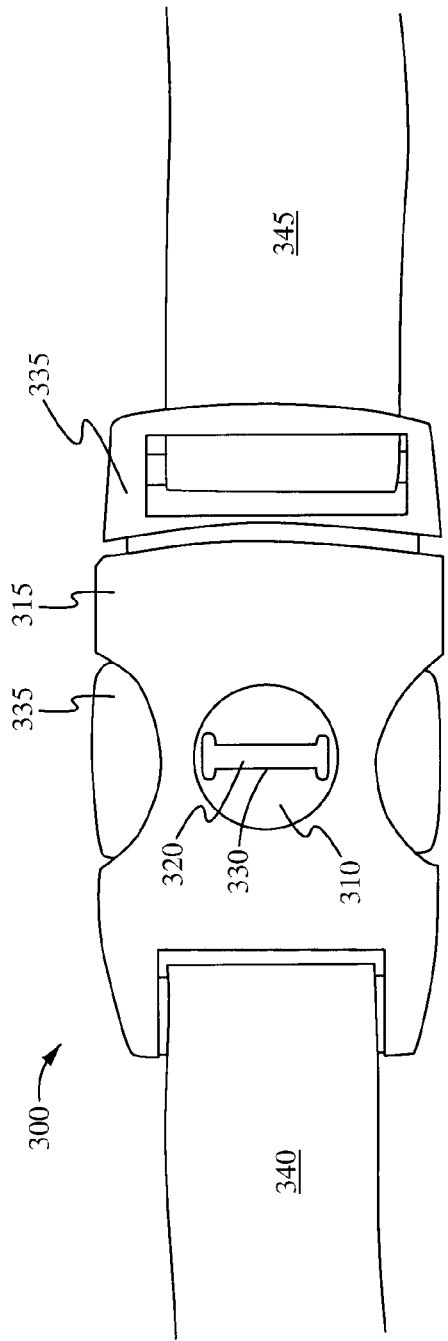
FIGS. 3A-B illustrate one embodiment of a headset cord holder having a groove molded onto the front face of a side squeeze buckle used on bags and packs in accordance with the principles of the present invention.
Figure 3B:
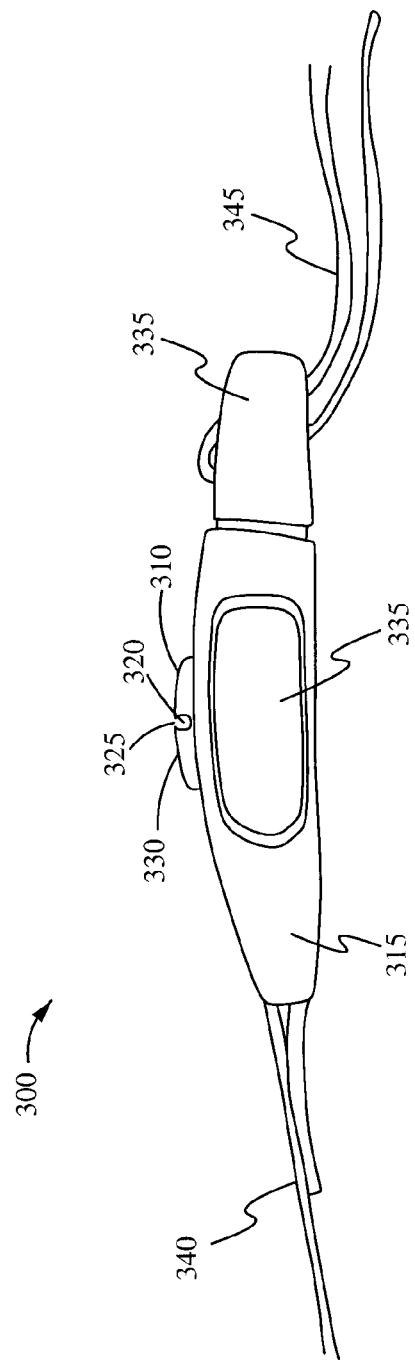
Figure 5B:
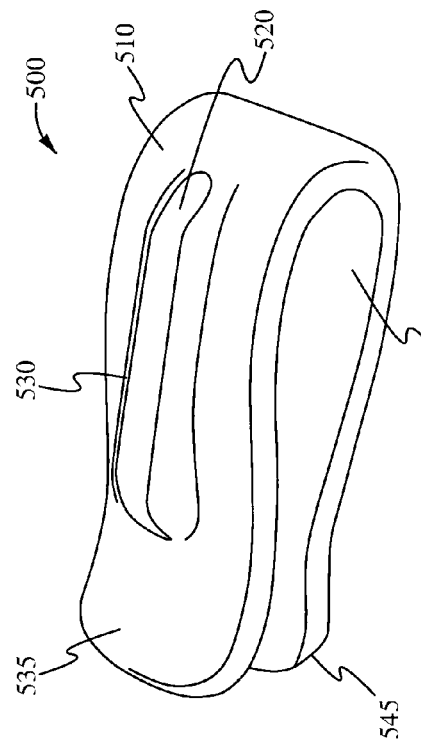
FIGS. 5A-D illustrate one embodiment of a headset cord holder having a groove molded into the outside of a clip for attachment to articles of clothing or bags in accordance with the principles of the present invention.
Figure 5D:
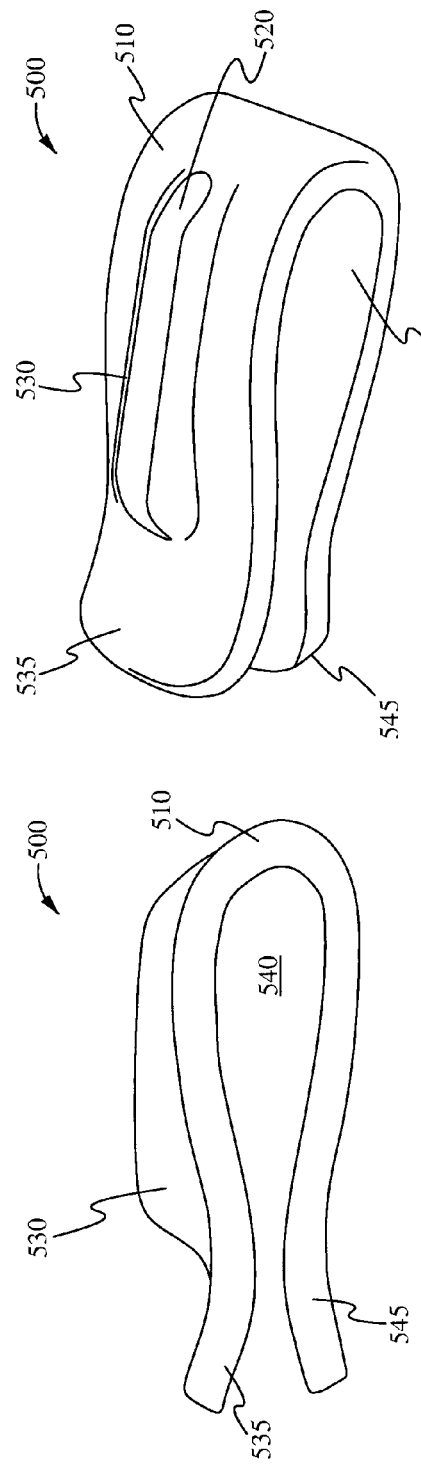
Figure 5A:
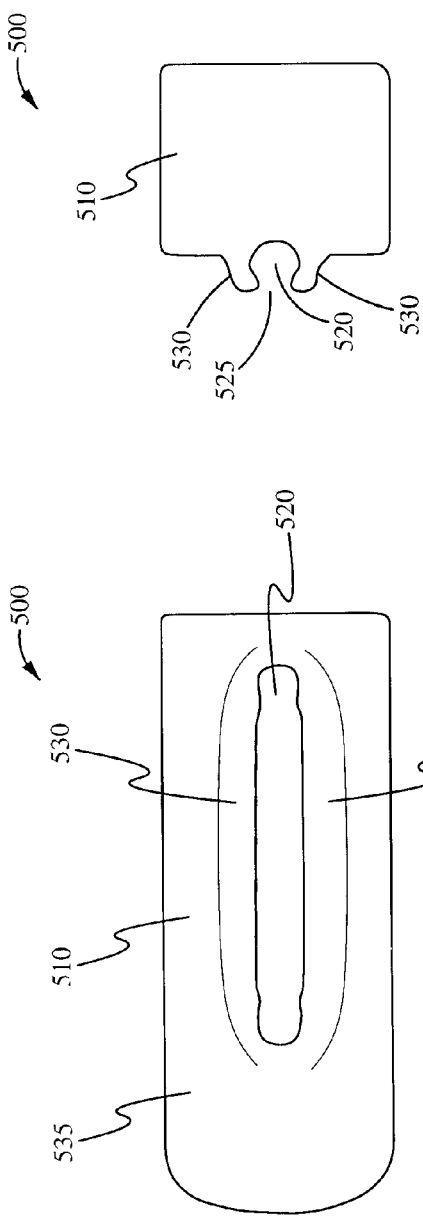
Figure 5C:
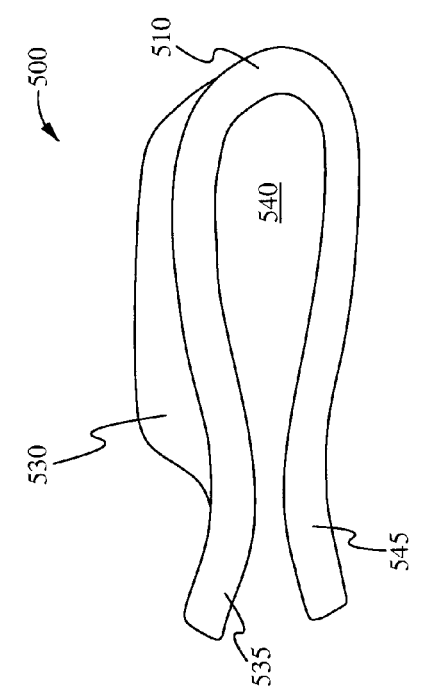

FIGS. 3A-B illustrate one embodiment of a headset cord holder 300 having a groove molded onto the front face of a side squeeze buckle used on bags and packs in accordance with the principles of the present invention. FIGS. 3A-B show a plan view and a side view of the cord holder 300, respectively.

The side squeeze buckle comprises a female buckle end 315 coupled to a buckle strap or webbing 340 and a male buckle end 335 coupled to a buckle strap or webbing 345. The female buckle end 315 is configured to receive and releasably hold the male buckle end 335. In some embodiments, either the female buckle end 315 or the male buckle end 335 comprises a groove body. In some embodiments, the groove body comprises a portion 310 that protrudes from either the female buckle end 315, as seen in FIGS. 3A-B, or the male buckle end 335. In some embodiments, the groove body does not protrude from the rest of the buckle end, but rather is flush with the rest of the buckle end. Additionally, in some embodiments, the body, including any protruding portion 310, is integrally formed with the buckle end, while in other embodiments, the body is a separate component that is attached to the buckle end. In some embodiments, the groove body is configured to act as a closure mechanism capable of releasably coupling a first strap, and any item to which the first strap is attached, to a second strap, and any item to which the second strap is attached. For example, in some embodiments, the groove body is part of a female buckle end 315 that is coupled to a first portion of a bag via a strap 340. The female buckle end 315 mates with a male buckle end 335. The male buckle end 335 is coupled to a second portion of the bag via a strap 345.

A groove 320 is molded or otherwise built into the groove body. The groove 320 is configured to receive and releasably secure a headset cord. In some embodiments, the groove 320 is defined by a groove wall 330 that surrounds most of the groove 320, leaving only an entry space 325 through which the cord can access the groove 320. In some embodiments, the entry space 325 has a smaller diameter than the groove 320 and the cord, thereby securing the cord within the confines of the groove wall 330 and requiring a significant amount of force for its removal. In some embodiments, portions of the groove wall 330 are flexible so that as the cord is pushed through the entry space 325, the cord is able to force the groove wall 330 out of its way and temporarily increase the diameter of the entry space 325 so that the cord can pass through the entry space 325 into the groove 320. In some embodiments, the groove wall 330 is substantially rigid, thereby forcing the outer sleeve of the cord to constrict as it passes through the entry space 325 between the ends of the groove wall 330.

It is contemplated that the groove 320 is able to be molded in various directions depending on its intended use. In some embodiments, the groove 320 is built into a groove body that is configured to swivel about the buckle end, or other support member, to which it is attached, thereby allowing the groove 320 to be rotated into a desired position.

FIGS. 4A-B illustrate one embodiment of a headset cord holder 400 having a groove 420 molded into the surface of a plastic or metal snap fastener in accordance with the principles of the present invention. It is contemplated that the snap fastener is capable of being used on a shirt 460, as shown in FIG. 4A, or on another item of clothing or a bag.

The shirt snap comprises a male snap 435 and a female snap 445 that are configured to releasably couple to one another. For example, in some embodiments, the male snap 435 comprises a stud 440 that is configured to fit securely into an aperture in the female snap 445. The perimeter of the aperture is defined by the inner circumference of the socket lip 450 and the base 455 of the female snap 445. In some embodiments, the socket lip 450 extends farther towards the aperture than the base 455, and the end of the stud 440 has a larger diameter than the base of the stud 440. In this configuration, the end of the stud 440, when inserted into the aperture, snaps into place, and is secured from accidental removal by the socket lip 450.

The shirt snap comprises a groove body 410. In some embodiments, the groove body 410 is integrally formed with the male snap 435 or the female snap 445. In other embodiments, the groove body 410 is a distinct component that is attached to the male snap 435 or the female snap 445. For example, FIG. 4B shows an exploded view of the cord holder 400 with the groove body 410 separated from the male snap 435. The groove body 410 comprises a base stud 415 that fits securely into an aperture in the male snap 435. In some embodiments, the groove body (as a part of the snap fastener) is configured to act as a closure mechanism capable of releasably coupling a first portion of an item of clothing or a bag to a second portion of the article of clothing or bag.

A groove 420 is molded or otherwise built into the groove body 410. The groove 420 is configured to receive and releasably secure a headset cord. In some embodiments, the groove 420 is defined by a groove wall 430 that surrounds most of the groove 420, leaving only an entry space 425 through which the cord can access the groove 420. In some embodiments, the entry space 425 has a smaller diameter than the groove 420 and the cord, thereby securing the cord within the confines of the groove wall 430 and requiring a significant amount of force for its removal. In some embodiments, portions of the groove wall 430 are flexible so that as the cord is pushed through the entry space 425, the cord is able to force the groove wall 430 out of its way and temporarily increase the diameter of the entry space 425 so that the cord can pass through the entry space 425 into the groove 420. In some embodiments, the groove wall 430 is substantially rigid, thereby forcing the outer sleeve of the cord to constrict as it passes through the entry space 425 between the ends of the groove wall 430. FIG. 4A shows the cord holder 400 in use as a shirt snap fastener on a user's shirt 460. The cord holder 400 holds a cord 465 that connects the user's Ipod 470 to the user's earphones 475.

It is contemplated that the groove 420 is able to be molded in various directions depending on its intended use. In some embodiments, the groove 420 is built into a groove body 410 that is configured to swivel about the rest of the snap fastener to which it is attached, thereby allowing the groove 420 to be rotated into a desired position.

FIGS. 5A-D illustrate one embodiment of a headset cord holder 500 having a groove 520 molded into the outside of a clip in accordance with the principles of the present invention. It is contemplated that the clip is capable of being attached to bags or articles of clothing, such as pants and the collar of a t-shirt.

The clip comprises a body 510 that is configured to be coupled to a bag or an item of clothing. The body 510 comprises a first opposing member 535 that curves around into a second opposing member 545 to form a substantially U-shaped clip. The separation between the two opposing members 535 and 545, along with the curved portion connecting them, forms a channel 540 that is configured to receive a portion of an item of clothing or a bag. In some embodiments, this channel 540 enables the secure translation of the body 510 along the bag or item of clothing to which it is attached.

A groove 520 is molded or otherwise built into the body 510. The groove 520 is configured to receive and releasably secure a headset cord. In some embodiments, the groove 520 is defined by a groove wall 530 that surrounds most of the groove 520, leaving only an entry space 525 through which the cord can access the groove 520. In some embodiments, the entry space 525 has a smaller diameter than the groove 520 and the cord, thereby securing the cord within the confines of the groove wall 530 and requiring a significant amount of force for its removal. In some embodiments, portions of the groove wall 530 are flexible so that as the cord is pushed through the entry space 525, the cord is able to force the groove wall 530 out of its way and temporarily increase the diameter of the entry space 525 so that the cord can pass through the entry space 525 into the groove 520. In some embodiments, the groove wall 530 is substantially rigid, thereby forcing the outer sleeve of the cord to constrict as it passes through the entry space 525 between the ends of the groove wall 530.

Figure 6A:
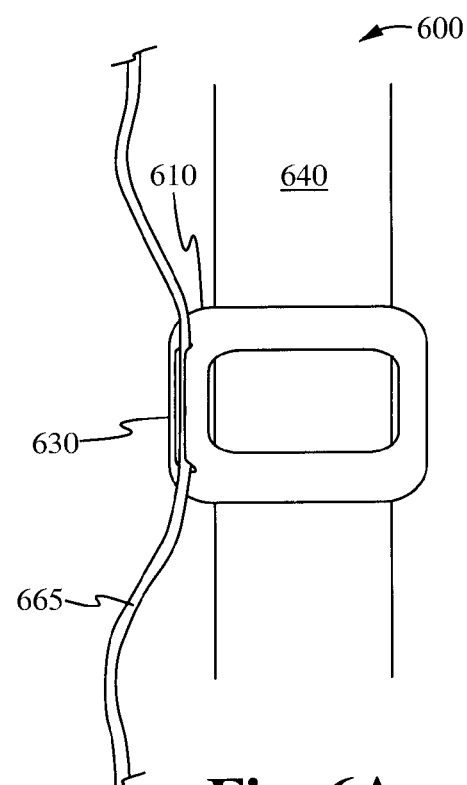
FIGS. 6A-C illustrate one embodiment of a headset cord holder having a groove molded onto a 3-bar webbing slider used on bags and packs in accordance with the principles of the present invention.
Figure 6B:
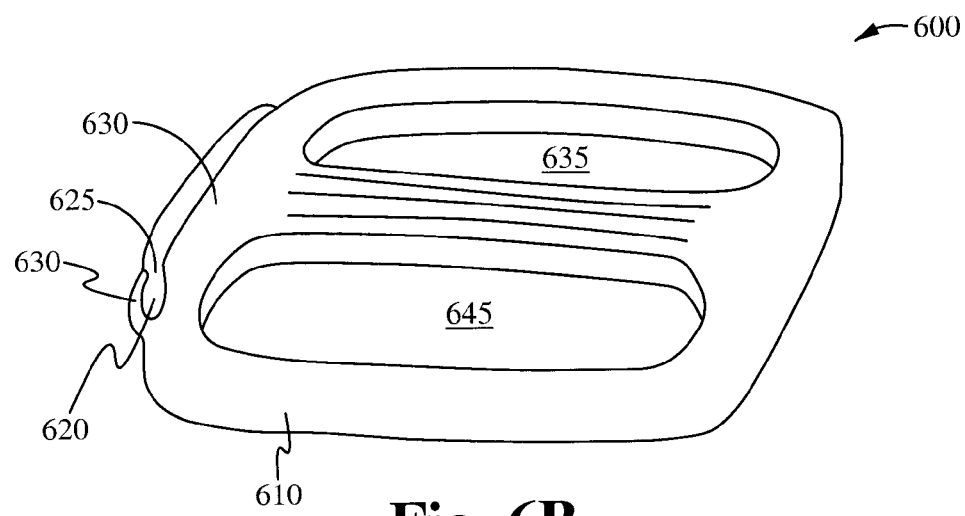
Figure 6C:
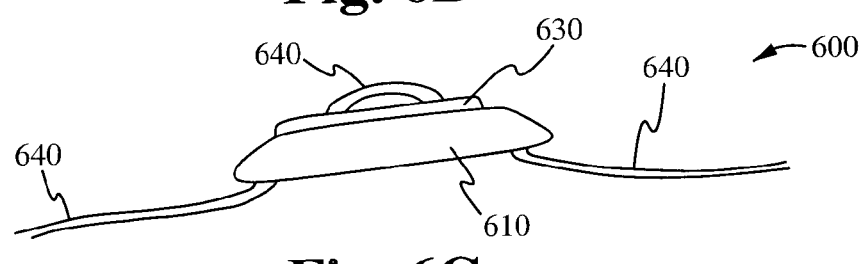

FIGS. 6A-C illustrate one embodiment of a headset cord holder 600 having a groove 620 molded onto a 3-bar webbing slider in accordance with the principles of the present invention. It is contemplated that the slider is capable of being used on the webbing and straps of a bag and packs.

The slider comprises a body 610 that is configured to receive the webbing or the strap 640 of a bag. The body 610 comprises at least two openings 635 and 645 that are separated by a bar and configured to receive the strap 640. These openings 635 and 645, along with the separating bar, enable the secure translation of the body 610 along the strap to which it is attached.

A groove 620 is molded or otherwise built into the body 610. The groove 620 is configured to receive and releasably secure a headset cord 665. In some embodiments, the groove 620 is defined by a groove wall 630 that surrounds most of the groove 620, leaving only an entry space 625 through which the cord 665 can access the groove 620. In some embodiments, the entry space 625 has a smaller diameter than the groove 620 and the cord 665, thereby securing the cord 665 within the confines of the groove wall 630 and requiring a significant amount of force for its removal. In some embodiments, portions of the groove wall 630 are flexible so that as the cord 665 is pushed through the entry space 625, the cord 665 is able to force the groove wall 630 out of its way and temporarily increase the diameter of the entry space 625 so that the cord 665 can pass through the entry space 625 into the groove 620. In some embodiments, the groove wall 630 is substantially rigid, thereby forcing the outer sleeve of the cord 665 to constrict as it passes through the entry space 625 between the ends of the groove wall 630.

Figure 12:
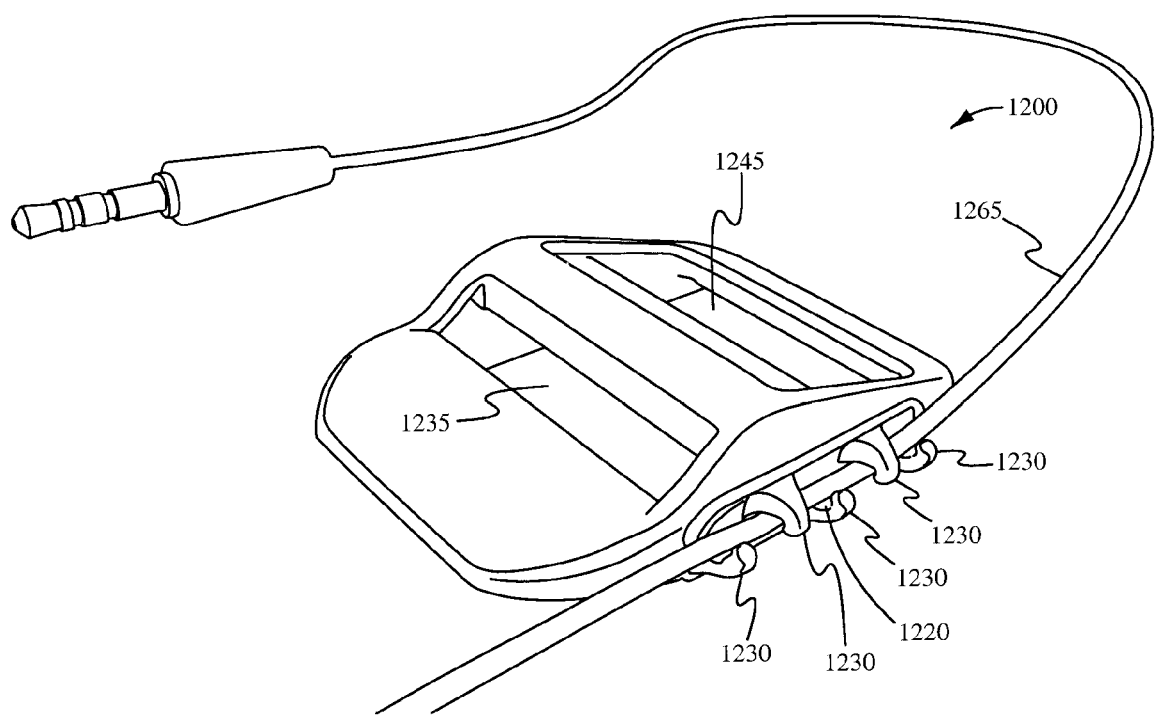
FIG. 12 illustrates another embodiment of a headset cord holder having a groove molded onto a slider used on bags and packs in accordance with the principles of the present invention.

FIG. 12 illustrates another embodiment of a headset cord holder 1200 having a groove built into a slider used on bags and packs in accordance with the principles of the present invention. The slider is capable of being used on webbing and straps. The slider comprises a body that is configured to receive a webbing or strap. The body comprises at least two openings 1235 and 1245 that are configured to receive the strap. These openings 1235 and 1245, along with the separating bar, enable the secure translation of the body along the strap to which it is attached.

A groove 1220 is molded or otherwise built into the body. The groove 1220 is configured to receive and releasably secure a headset cord 1265. In some embodiments, the groove 1220 is defined by a groove wall 1230 that surrounds most of the groove 1220, leaving only an entry space through which the cord 1265 can access the groove 1220. In some embodiments, the entry space has a smaller diameter than the groove 1220 and the cord 1265, thereby securing the cord 1265 within the confines of the groove wall 1230 and requiring a significant amount of force for its removal. In some embodiments, portions of the groove wall 1230 are flexible so that as the cord 1265 is pushed through the entry space, the cord 1265 is able to force the groove wall 1230 out of its way and temporarily increase the diameter of the entry space so that the cord 1265 can pass through the entry space into the groove 1220. In some embodiments, the groove wall 1230 is substantially rigid, thereby forcing the outer sleeve of the cord 1265 to constrict as it passes through the entry space between the ends of the groove wall 1230.

In contrast to the continuous groove walls 630 shown in FIGS. 6A-C, the groove walls 1230, which define the groove 1220, are segmented. In some embodiments, the opposing segmented groove walls 1230 are offset from one another. The segmentation and offsetting of the groove walls 1230 provides additional or alternative entry spaces through which the groove 1220 is able to receive the cord 1265.

FIGS. 7A-D illustrate headset cord holders 700 and 705 having a groove 720 molded into an adornment in accordance with the principles of the present invention. In some embodiments, the adornment is an ornamental accessory having an aesthetic characteristic unrelated to its functional structure, such as the star shape in FIGS. 7A-B and the moon shape in FIGS. 7C-D. The buttons, zippers, buckles, snaps, clips, and sliders shown in the previous figures would not constitute an adornment since they do not have an aesthetic characteristic that is unrelated to their functional structure. However, if they were modified to have a certain aesthetic shape that was completely unrelated to their functionality, then they could be considered an adornment.

The adornment comprises a body 710 that is configured to be releasably secured to a bag or an article of clothing, such as shirt 760. In some embodiments, the body 710 comprises a pin 735 extending from its base. The pin 735 is configured to penetrate the bag or item of clothing. In some embodiments, one or more flanges 740 are disposed proximate the end of the pin 735 to facilitate the attachment of the adornment to the bag or article of clothing. In some embodiments, a clasp 745 having releases 750 is provided along with the adornment in order to provide a secure attachment of the adornment to the bag or article of clothing.

A groove 720 is molded or otherwise built into the body 710. The groove 720 is configured to receive and releasably secure a headset cord. In some embodiments, the groove 720 is defined by a groove wall 730 that surrounds most of the groove 720, leaving only an entry space 725 through which the cord 765 can access the groove 720. In some embodiments, the entry space 725 has a smaller diameter than the groove 720 and the cord 765, thereby securing the cord 765 within the confines of the groove wall 730 and requiring a significant amount of force for its removal. In some embodiments, portions of the groove wall 730 are flexible so that as the cord 765 is pushed through the entry space 725, the cord 765 is able to force the groove wall 730 out of its way and temporarily increase the diameter of the entry space 725 so that the cord 765 can pass through the entry space 725 into the groove 720. In some embodiments, the groove wall 730 is substantially rigid, thereby forcing the outer sleeve of the cord 765 to constrict as it passes through the entry space 725 between the ends of the groove wall 730. FIG. 7A shows the cord holder 700 in use on a user's shirt 760. The cord holder 700 holds a cord 765 that connects the user's Ipod 770 to the user's earphones 775.

Figure 8:
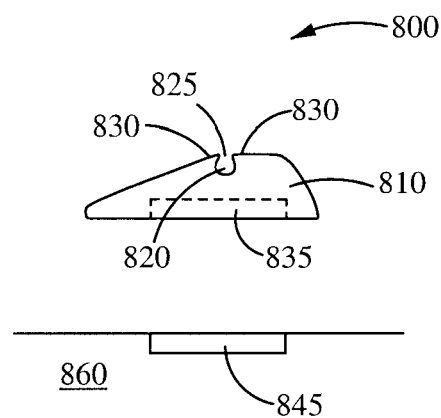
FIG. 8 illustrates one embodiment of a headset cord holder having a groove molded onto an adornment that utilizes a magnetic attachment in accordance with the principles of the present invention.

Although FIG. 7D illustrates the body using a pin for attachment, it is contemplated that the body can employ other means for releasably securing itself to a bag or an article of clothing. For example, FIG. 8 illustrates one embodiment of a headset cord holder 800 having a groove molded onto an adornment that utilizes a magnetic attachment in accordance with the principles of the present invention.

The adornment comprises a body 810 having a magnet 835. It is contemplated that the magnet 835 can be disposed on the body 810 in a variety of different ways. In some embodiments, the magnet 835 is embedded within the body. In some embodiments, the magnet 835 is fixed to the outer surface of the body 810. The magnet 835 is configured to releasably secure the body 810 to an item 860, such as a bag or an article of clothing, by mating via magnetic attraction with a corresponding magnet or piece of metal 845 disposed on the item 860. The corresponding magnet or piece of metal 845 can be disposed on the item 860 in a variety of ways. In some embodiments, the corresponding magnet or piece of metal 845 is embedded within the item 860. In some embodiments, the corresponding magnet or piece of metal 845 is attached to the outer surface of the item 860.

A groove 820 is molded or otherwise built into the body 810. The groove 820 is configured to receive and releasably secure a headset cord. In some embodiments, the groove 820 is defined by a groove wall 830 that surrounds most of the groove 820, leaving only an entry space 825 through which the cord can access the groove 820. In some embodiments, the entry space 825 has a smaller diameter than the groove 820 and the cord, thereby securing the cord within the confines of the groove wall 830 and requiring a significant amount of force for its removal. In some embodiments, portions of the groove wall 830 are flexible so that as the cord is pushed through the entry space 825, the cord is able to force the groove wall 830 out of its way and temporarily increase the diameter of the entry space 825 so that the cord can pass through the entry space 825 into the groove 820. In some embodiments, the groove wall 830 is substantially rigid, thereby forcing the outer sleeve of the cord to constrict as it passes through the entry space 825 between the ends of the groove wall 830.

Furthermore, in some embodiments, the embodiments discussed above are modified to incorporate additional grooves. Additional grooves are provided for a variety of reasons and configured for a variety of purposes.

Figure 9A:
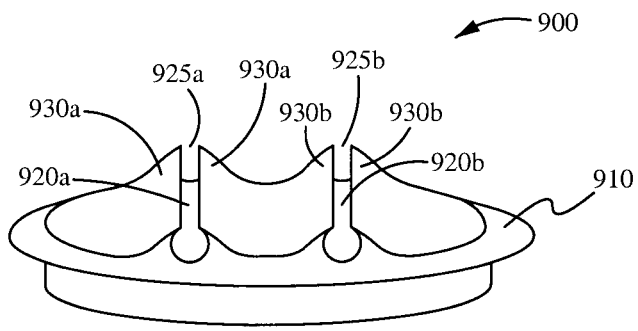
FIGS. 9A-B illustrate embodiments of a headset cord holder having two substantially parallel grooves in accordance with the principles of the present invention.
Figure 9B:
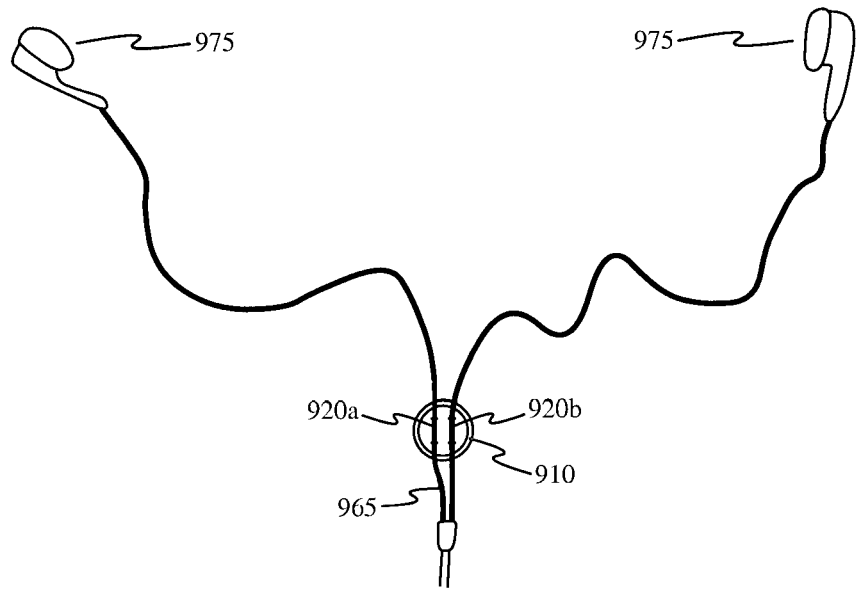

FIGS. 9A-B illustrate embodiments of a headset cord holder 900 having two substantially parallel grooves in accordance with the principles of the present invention. Although FIGS. 9A-B show the two grooves built into a snap fastener similar to the fastener shown in FIGS. 4A-B, it is contemplated that the two groove configuration, and any other multiple groove configurations, is capable of being incorporated into any groove body embodiments that are consistent with the principles of the present invention.

The headset cord holder 900 comprises a groove body 910. A first groove 920a and a second groove 920b are molded or otherwise built into the groove body 910. The grooves 920a and 920b are configured to receive and releasably secure a headset cord and are substantially parallel to one another. In some embodiments, the grooves 920a and 920b are defined by groove walls 930a and 930b, respectively, that surround most of their respective grooves 920a and 920b, leaving only entry spaces 925a and 925b through which the cord can access the grooves 920a and 920b. In some embodiments, the entry spaces 925a and 925b have smaller diameters than the grooves 920a and 920b and the cord, thereby securing the cord within the confines of the groove wall and requiring a significant amount of force for its removal. In some embodiments, portions of the groove walls 930a and 930b are flexible so that as the cord is pushed through either entry space 925a or 925b, the cord is able to force the groove wall out of its way and temporarily increase the diameter of the entry space so that the cord can pass through the entry space into the groove. In some embodiments, the groove wall is substantially rigid, thereby forcing the outer sleeve of the cord to constrict as it passes through the entry space between the ends of the groove wall.

FIG. 9B shows the cord holder 900 in use. The cord holder 900 holds the upper branches of a cord 965 that connects a user's device to the user's earphones 975. The use of two grooves allows the present invention to secure both branches of the headset separately.

Figure 10A:
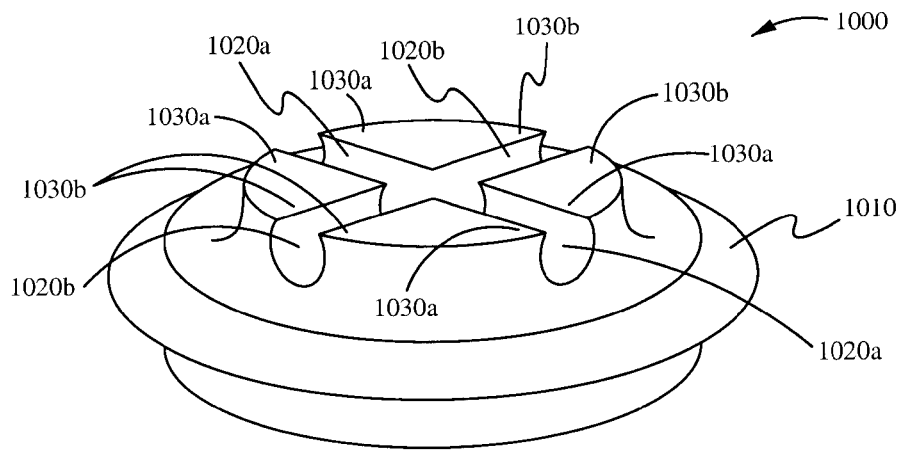
FIGS. 10A-B illustrate embodiments of a headset cord holder having two intersecting grooves in accordance with the principles of the present invention.
Figure 10B:
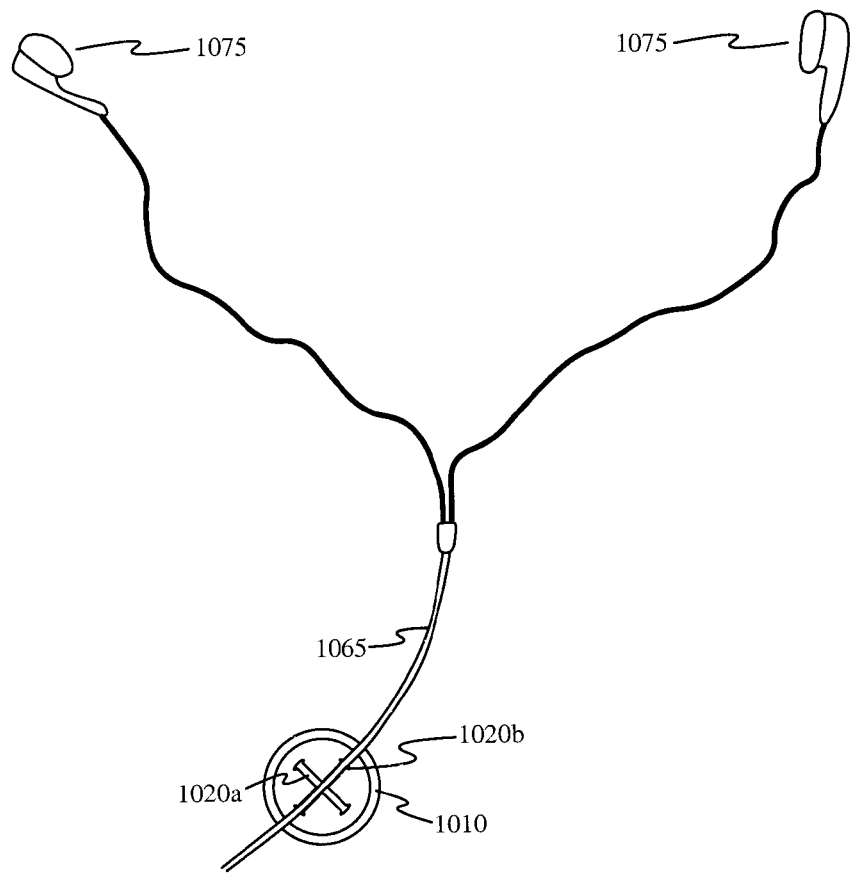

FIGS. 10A-B illustrate embodiments of a headset cord holder 1000 having two intersecting grooves in accordance with the principles of the present invention. Although FIGS. 10A-B show the two grooves built into a snap fastener similar to the fastener shown in FIGS. 4A-B, it is contemplated that the two groove configuration, and any other multiple groove configurations, is capable of being incorporated into any groove body embodiments that are consistent with the principles of the present invention.

The headset cord holder 1000 comprises a groove body 1010. A first groove 1020a and a second groove 1020b are molded or otherwise built into the groove body 1010. The grooves 1020a and 1020b are configured to receive and releasably secure a headset cord and have diverging paths as they extend away from their point of intersection. In some embodiments, the grooves have a diverging paths, but do not actually intersect with one another.

In some embodiments, the grooves 1020a and 1020b are defined by groove walls 1030a and 1030b, respectively, that surround most of their respective grooves 1020a and 1020b, leaving only entry spaces through which the cord can access the grooves 1020a and 1020b. In some embodiments, the entry spaces have smaller diameters than the grooves 1020a and 1020b and the cord, thereby securing the cord within the confines of the groove wall and requiring a significant amount of force for its removal. In some embodiments, portions of the groove walls 1030a and 1030b are flexible so that as the cord is pushed through the entry space, the cord is able to force the groove wall out of its way and temporarily increase the diameter of the entry space so that the cord can pass through the entry space into the groove. In some embodiments, the groove wall is substantially rigid, thereby forcing the outer sleeve of the cord to constrict as it passes through the entry space between the ends of the groove wall.

FIG. 10B shows the cord holder 1000 in use. The cord holder 1000 holds a cord 1065 that connects a user's device to the user's earphones 1075. The use of two grooves having diverging paths allows the user to secure the cord in either direction. Additionally, the two grooves 1020a and 1020b are capable of also being used to secure both branches of the headset separately, similar to the embodiment shown in FIG. 9B.

Figure 11A:
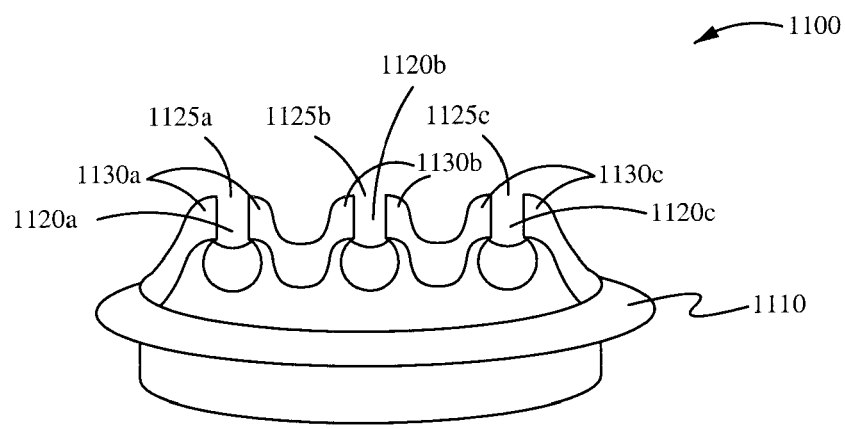
FIGS. 11A-B illustrate embodiments of a headset cord holder having three grooves in accordance with the principles of the present invention.
Figure 11B:
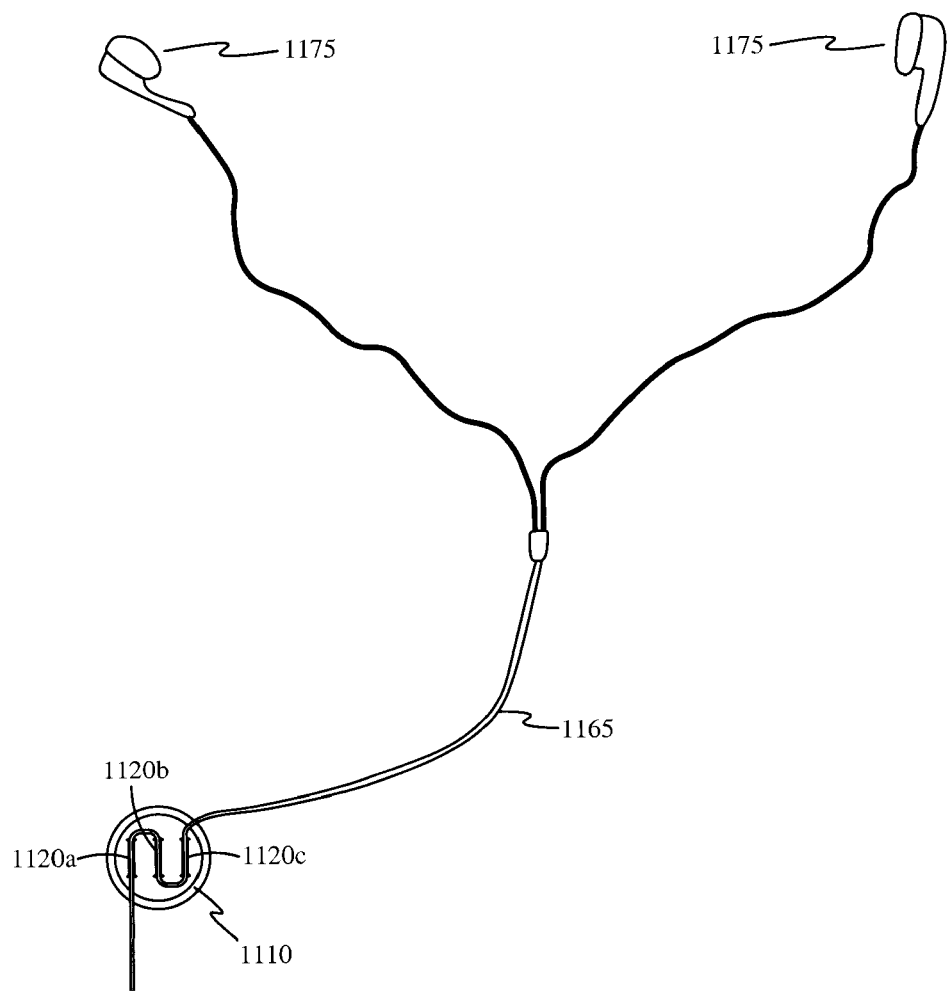

FIGS. 11A-B illustrate embodiments of a headset cord holder 1100 having three grooves in accordance with the principles of the present invention. Although FIGS. 11A-B show the two grooves built into a snap fastener similar to the fastener shown in FIGS. 4A-B, it is contemplated that the three groove configuration, and any other multiple groove configurations, is capable of being incorporated into any groove body embodiments that are consistent with the principles of the present invention.

The headset cord holder 1100 comprises a groove body 1110. A first groove 1120a, a second groove 1120b, and a third groove 1120c are molded or otherwise built into the groove body 1110. The grooves 1120a, 1120b, and 1120c are configured to receive and releasably secure a headset cord. In some embodiments, the grooves are substantially parallel to one another. In some embodiments, the grooves run in sequence. However, it is contemplated that a variety of different configurations are capable of being be employed with respect to the arrangement of the grooves. Additionally, it is contemplated that, in some embodiments, more than the two or three grooves shown in the figures are disposed on the groove body.

In some embodiments, the grooves 1120a, 1120b, and 1120c are defined by groove walls 1130a, 1130b, and 1130c, respectively, that surround most of their respective grooves 1120a, 1120b, and 1120c, leaving only entry spaces 1125a, 1125b, and 1125c through which the cord can access the grooves 1120a, 1120b, and 1120c. In some embodiments, the entry spaces 1125a, 1125b, and 1125c have smaller diameters than the grooves 1120a, 1120b, and 1120c and the cord, thereby securing the cord within the confines of the groove wall and requiring a significant amount of force for its removal. In some embodiments, portions of the groove walls 1130a, 1130b, and 1130c are flexible so that as the cord is pushed through either entry space 1125a, 1125b, and 1125c, the cord is able to force the groove wall out of its way and temporarily increase the diameter of the entry space so that the cord can pass through the entry space into the groove. In some embodiments, the groove wall is substantially rigid, thereby forcing the outer sleeve of the cord to constrict as it passes through the entry space between the ends of the groove wall.

FIG. 11B shows the cord holder 1100 in use. The cord holder 1100 holds a cord 1165 that connects a user's device to the user's earphones 1175. The use of three provides the user with means for securing and/or controlling any extra length of the cord. Additionally, any two of the three grooves are capable of being used to secure both branches of the headset separately, similar to the embodiment shown in FIG. 9B.

Figure 13:
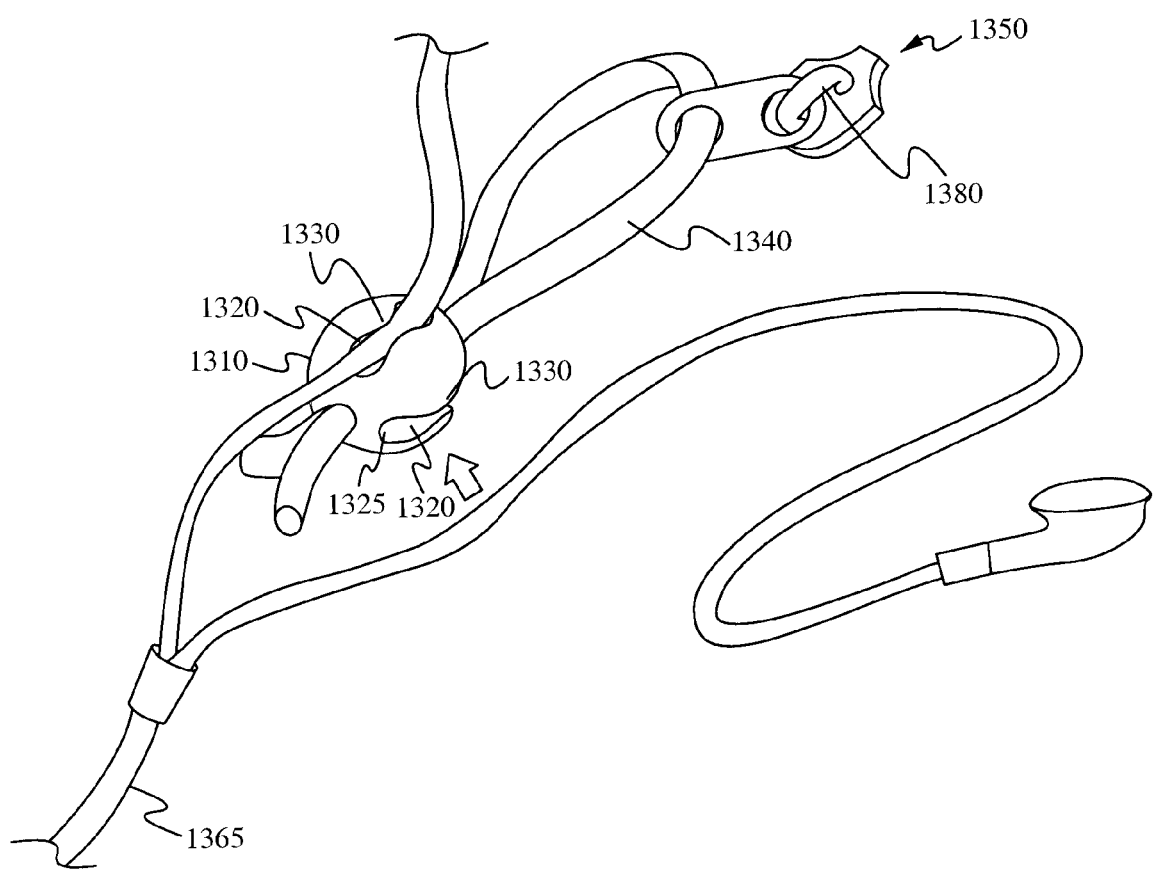
FIG. 13 illustrates an embodiment of a headset cord holder having a groove molded into a zipper puller in accordance with some embodiments.

FIG. 13 illustrates an embodiment of a headset cord holder 1300 having a groove molded into the body 1310 in accordance with some embodiments.

The body 1310 is configured to be coupled to a zipper head 1350. The body comprises a puller 1340 which is coupled to the body 1310. As shown in FIG. 13, in some embodiments, the puller 1340 is a cord which passes through the center of the body 1310. In some embodiments the puller 1340 is a cord which couples the body 1310 with an opening 1380. In some embodiments the body 1310 comprises one or more of wood, glass, and metal.

A groove 1320 is molded or otherwise built into the body 1310. The groove 1320 is configured to receive and releasably secure a headset cord 1365. In some embodiments, the groove 1320 is defined by a groove wall 1330 that surrounds most of the groove 1320, leaving only an entry space 1325 through which the cord 1365 can access the groove 1320. In some embodiments, the entry space 1325 has a smaller diameter than the groove 1320 and the cord 1365, thereby securing the cord within the confines of the groove wall 1330 and requiring a significant amount of force for its removal. In some embodiments, portions of the groove wall 1330 are flexible so that as the cord is pushed through the entry space 1325, the cord is able to force the groove wall 1330 out of its way and temporarily increase the diameter of the entry space 1325 so that the cord can pass through the entry space 1325 into the groove 1320. In some embodiments, the groove wall 1330 is substantially rigid, thereby forcing the outer sleeve of the cord to constrict as it passes through the entry space 1325 between the ends of the groove wall 1330. As further shown in FIG. 13, in some embodiments, the body 1310 comprises one or more additional grooves. In these embodiments, a user is able to place a right side and a left side of the headset cord 1365 in a corresponding groove. Alternatively, in some embodiments, a user is able to place both sides of a headset cord 1365 within only one of the grooves.

Figure 14A:
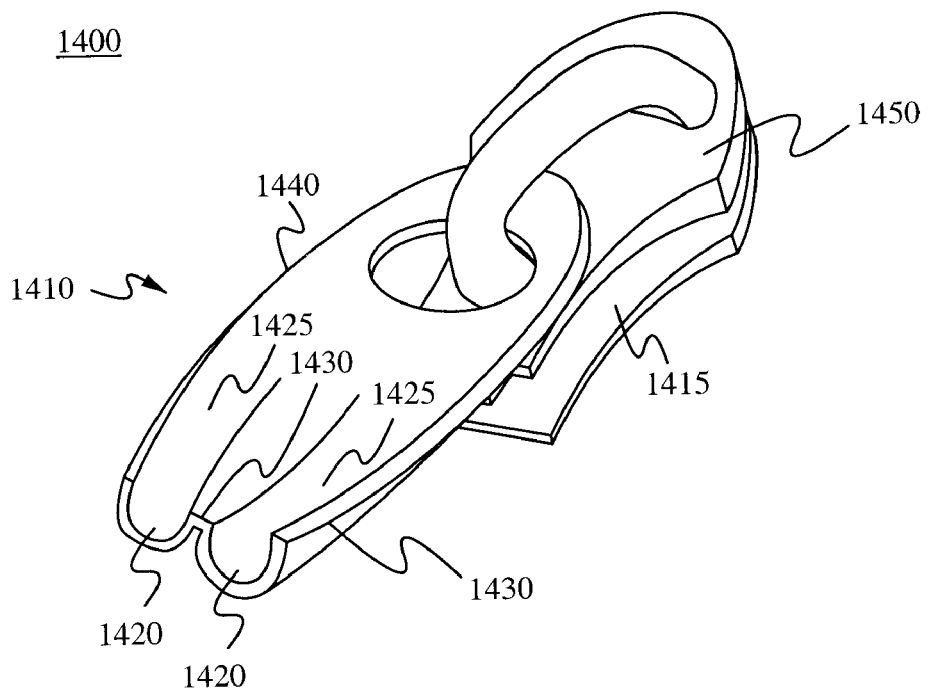
FIGS. 14A and 14B illustrate an embodiment of a headset cord holder having one or more grooves molded into a zipper in accordance with some embodiments.
Figure 14B:
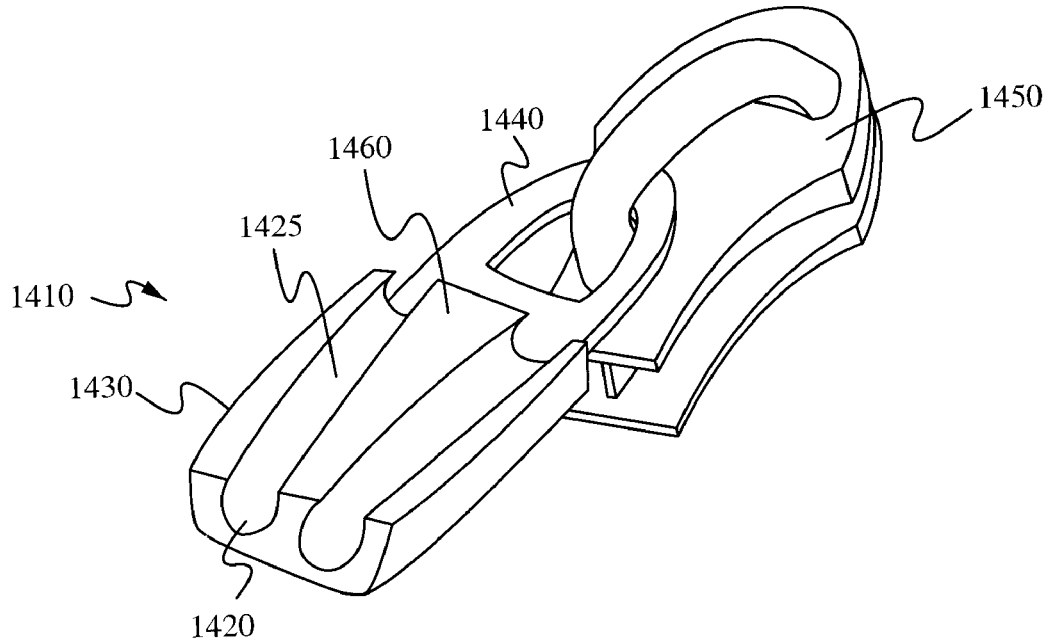

FIGS. 14A and 14B illustrate an embodiment of a head set cord holder having a groove molded into the body 1410 of a zipper puller 1450 in accordance with some embodiments.

The zipper puller 1450 is configured to be coupled to a bag or an item of clothing, such as a jacket or shirt. In some embodiments, the body 1410 is configured to act as a closure mechanism capable of releasably coupling a first portion of the bag or item of clothing to a second portion of the bag or article of clothing. For example, in some embodiments, the body 1410 comprises a channel (not shown) formed in opposing sidewalls 1415 in order to receive and releasably couple together zipper tracks of the first portion and the second portion. In some embodiments, a puller 1440 is coupled to the body 1410 in order to facilitate the translation of the body 1410 along the portions of the bag or item of clothing to which it is attached.

A groove 1420 is molded or otherwise built into the body 1410. The groove 1420 is configured to receive and releasably secure a headset cord. In some embodiments, as shown in FIGS. 14A and 14B, the body 1410 comprises a plurality of grooves 1420. However, the body 1410 is able to comprise any number of grooves as known in the art. For example, in some embodiments, the body 1410 is able to comprise three grooves (not shown). In these embodiments, the body 1410 is able to comprise two upward facing grooves and one downward facing groove. In some embodiments, the body 1410 comprises a stamped metal or a molded metal. In some embodiments, as shown in FIG. 14B, the body 1410 comprises an over molded plastic portion 1460 comprising the plurality of grooves 1420.

In some embodiments, the groove 1420 is defined by a groove wall 1430 that surrounds most of the groove 1420, leaving only an entry space 1425 through which the cord can access the groove 1420. In some embodiments, the entry space 1425 has a smaller diameter than the groove 1420 and the cord, thereby securing the cord within the confines of the groove wall 1430 and requiring a significant amount of force for its removal. In some embodiments, portions of the groove wall 1430 are flexible so that as the cord is pushed through the entry space 1425, the cord is able to force the groove wall 1430 out of its way and temporarily increase the diameter of the entry space 1425 so that the cord can pass through the entry space 1425 into the groove 1420. In some embodiments, the groove wall 1430 is substantially rigid, thereby forcing the outer sleeve of the cord to constrict as it passes through the entry space 1425 between the ends of the groove wall 1430.

Figure 15A:
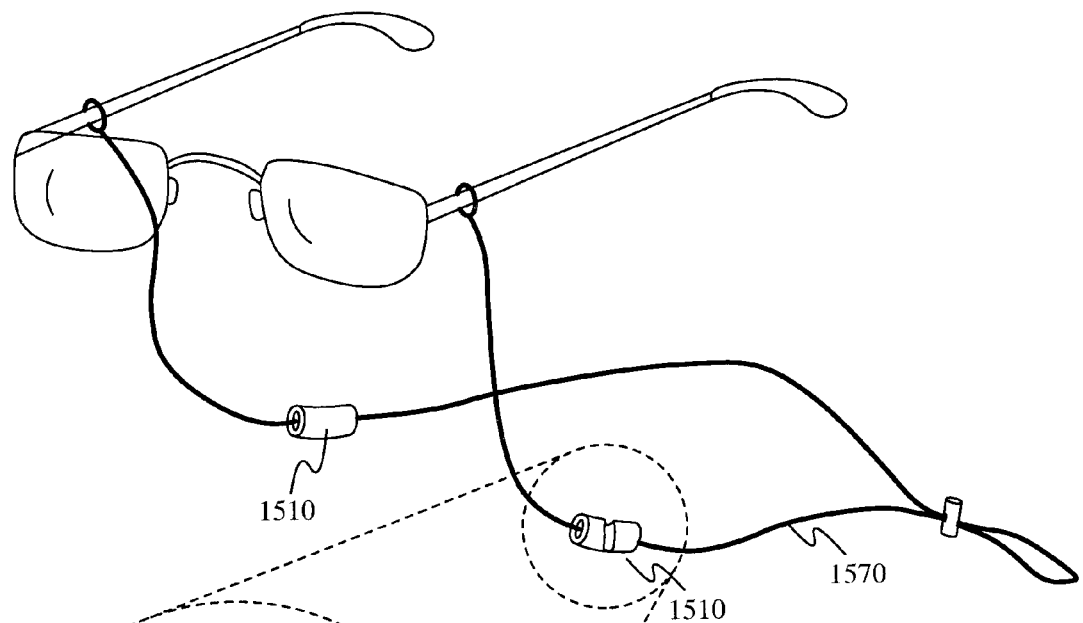
FIGS. 15A and 15B illustrate an embodiment of a headset cord having a groove molded into a body coupled with a sunglass lanyard in accordance with some embodiments.
Figure 15B:
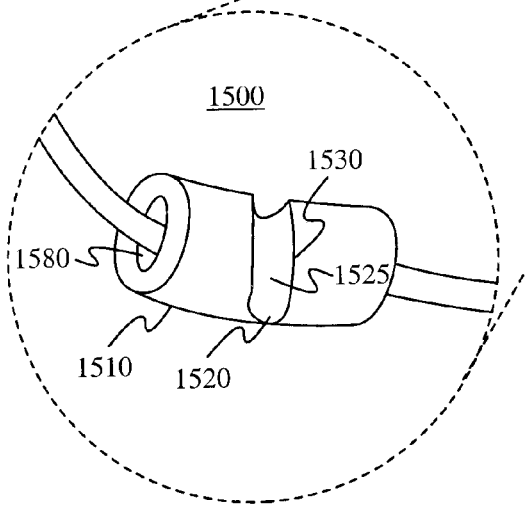

FIGS. 15A and 15B illustrate a headset cord holder 1500 in accordance with further embodiments. As shown in FIG. 15, the headset cord holder 1500 comprises a body 1510 having a groove molded into it.

The body 1510 is configured to be coupled to a lanyard for sun or prescription glasses. In some embodiments, the lanyard 1570 passes through an opening 1580 within the body 1510. However, the body 1510 is able to couple with the lanyard through a clip or any other mechanism as known in the art. As shown in FIG. 15, each side of the lanyard comprises a body 1510 of a headset cord holder 1500. However, in some embodiments, the headset cord holder 1500 is only coupled to one side of the lanyard 1570. In some embodiments, the body 1510 of the headset cord holder comprises one or more of molded plastic, hard plastic, foam and rubber. In some embodiments, the body 1510 of the headset cord holder comprises one or more of wood, glass, and metal.

In some embodiments, the groove 1520 is defined by a groove wall 1530 that surrounds most of the groove 1520, leaving only an entry space 1525 through which the cord can access the groove 1520. In some embodiments, the entry space 1525 has a smaller diameter than the groove 1520 and the cord, thereby securing the cord within the confines of the groove wall 1530 and requiring a significant amount of force for its removal. In some embodiments, portions of the groove wall 1530 are flexible so that as the cord is pushed through the entry space 1525, the cord is able to force the groove wall 1530 out of its way and temporarily increase the diameter of the entry space 1525 so that the cord can pass through the entry space 1525 into the groove 1520. In some embodiments, the groove wall 1530 is substantially rigid, thereby forcing the outer sleeve of the cord to constrict as it passes through the entry space 1525 between the ends of the groove wall 1530.

Figures 16A, 16B:
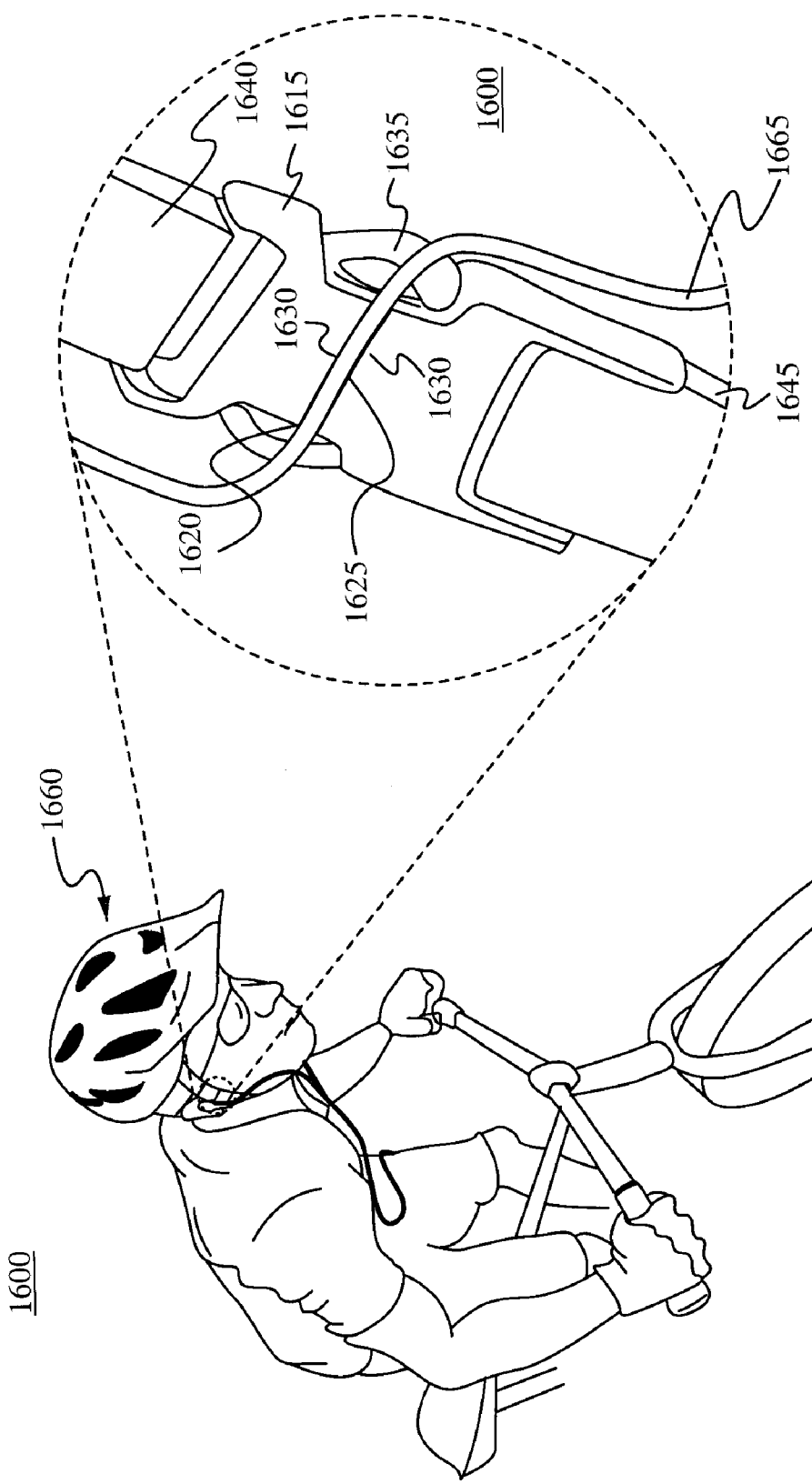
FIGS. 16A and 16B illustrate an embodiment of a headset cord having a groove molded into a releasable clip coupled to a sports helmet in accordance with some embodiments.

FIGS. 16A and 16B illustrate a headset cord holder 1600 in accordance with yet further embodiments. As shown in FIGS. 16A and 16B, the headset cord holder 1600 comprises a body having a groove molded into the front face of a releasable clip or side squeeze buckle configured to be attached to a sports helmet.

The releasable clip comprises a female buckle end 1615 coupled to a buckle strap or webbing 1645 and a male buckle end 1635 coupled to a buckle strap or webbing 1640. The female buckle end 1615 is configured to receive and releasably hold the male buckle end 1635. In some embodiments, either the female buckle end 1615 or the male buckle end 1635 comprises a groove body. In some embodiments, the groove body comprises a portion 1610 that protrudes from either the female buckle end 1615, or the male buckle end 1635. In some embodiments, the groove body does not protrude from the rest of the buckle end, but rather is flush with the rest of the buckle end. Additionally, in some embodiments, the body 1610, including any protruding portion, is integrally formed with the buckle end, while in other embodiments, the body is a separate component that is attached to the buckle end. In some embodiments, the groove body is configured to act as a closure mechanism capable of releasably coupling a first strap, and any item to which the first strap is attached, to a second strap, and any item to which the second strap is attached. For example, in some embodiments, the groove body is part of a female buckle end 1615 that is coupled to a first portion of a sports helmet via a strap 1645. The female buckle end 1615 mates with a male buckle end 1635. The male buckle end 1635 is coupled to a second portion of the sports helmet via a strap 1640.

Each end of the releasable clip 1615, 1635 is coupled by a strap 1645, 1640 to a sports helmet. As shown in FIG. 16B, the releasable clip is coupled to a bicycle helmet 1660. However, the releasable clip is able to be coupled to any sports helmet as known in the art. For example, in some embodiments the releasable clip is coupled to one or more of a skiing helmet, bicycle helmet, motorcycle helmet or other sports helmet.

A groove 1620 is molded or otherwise built into the groove body. The groove 1620 is configured to receive and releasably secure a headset cord 1665. In some embodiments, the groove 1620 is defined by a groove wall 1630 that surrounds most of the groove 1620, leaving only an entry space 1625 through which the cord can access the groove 1620. In some embodiments, the entry space 1625 has a smaller diameter than the groove 1620 and the cord 1665, thereby securing the cord within the confines of the groove wall 1630 and requiring a significant amount of force for its removal. In some embodiments, portions of the groove wall 1630 are flexible so that as the cord is pushed through the entry space 1625, the cord is able to force the groove wall 1630 out of its way and temporarily increase the diameter of the entry space 1625 so that the cord can pass through the entry space 1625 into the groove 1620. In some embodiments, the groove wall 1630 is substantially rigid, thereby forcing the outer sleeve of the cord to constrict as it passes through the entry space 1625 between the ends of the groove wall 1630.

As shown in FIG. 16A, a headset cord 1665 is releasably held within a groove 1620. It is contemplated that the groove 1620 is able to be molded in various directions depending on its intended use. In some embodiments, the groove 1620 is built into a groove body that is configured to swivel about the clip end, or other support member, to which it is attached, thereby allowing the groove 1620 to be rotated into a desired position.

FIGS. 17A and 17B illustrate a headset cord holder 1700 in accordance with some embodiments. The headset cord holder 1700 comprises a body having a groove molded or built into the body which is a portion of a piece of jewelry 1770.

In some embodiments, the portion of jewelry is configured to be coupled to at least an additional article. For example, as shown in FIGS. 17A and 17B, the body is coupled to a bead of jewelry 1760 in a strand of beads comprising a necklace 1770. In some embodiments, the piece of jewelry is one or more of a broach, earrings, bracelet or sunglass lanyard. However, the body is able to be molded or built into any piece of jewelry as known in the art. Alternatively, in some embodiments one or more additional grooves is able to be molded in to the body or other portion of the piece of jewelry.

A groove 1720 is molded or otherwise built into the groove body. The groove 1720 is configured to receive and releasably secure a headset cord 1765. In some embodiments, the groove 1720 is defined by a groove wall 1730 that surrounds most of the groove 1720, leaving only an entry space 1725 through which the cord can access the groove 1720. In some embodiments, the entry space 1725 has a smaller diameter than the groove 1720 and the cord, thereby securing the cord within the confines of the groove wall 1730 and requiring a significant amount of force for its removal. In some embodiments, portions of the groove wall 1730 are flexible so that as the cord is pushed through the entry space 1725, the cord is able to force the groove wall 1730 out of its way and temporarily increase the diameter of the entry space 1725 so that the cord can pass through the entry space 1725 into the groove 1720. In some embodiments, the groove wall 1730 is substantially rigid, thereby forcing the outer sleeve of the cord to constrict as it passes through the entry space 1725 between the ends of the groove wall 1730.

Figure 18:
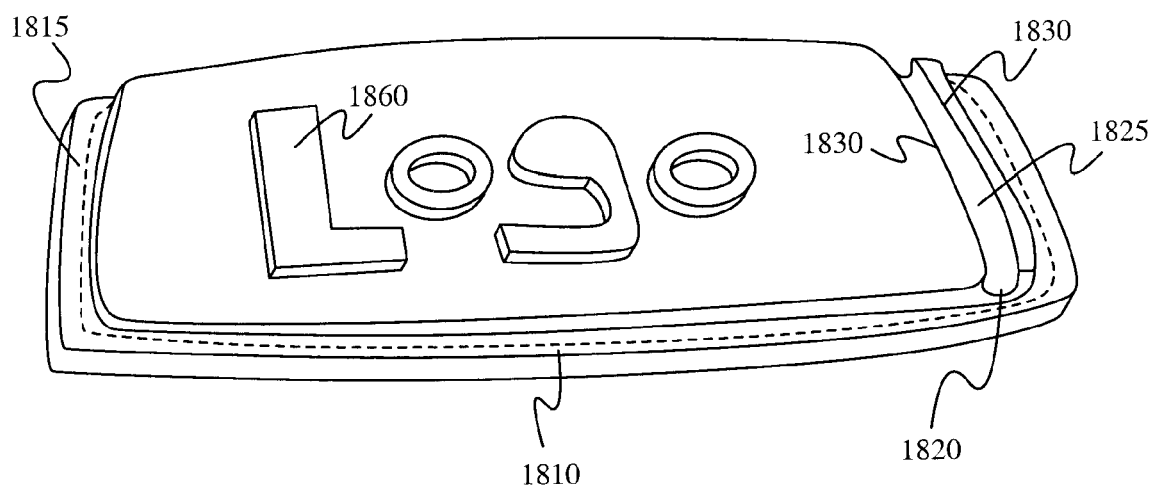
FIG. 18 illustrates an embodiment of a headset cord holder having a groove molded into an identifying surface in accordance with some embodiments.

FIG. 18 illustrates a headset cord holder 1800 in accordance with some embodiments. The headset cord holder 1800 comprises a body 1810 having a groove molded or built into the body 1810 which is a portion of an identifying surface 1860. The body 1810 is configured to be coupled to at least an additional article. In some embodiments, the body 1810 comprises one or more of rubber, plastic and metal. Particularly, the body 1810 is configured to attach an additional article by one or more of stitching, riveting, heat pressing, adhesive attachment, or chemical method. In some embodiments, the body 1810 comprises an additional surface 1815 which attaches to the additional article.

A groove 1820 is molded or otherwise built into the groove body. The groove 1820 is configured to receive and releasably secure a headset cord. In some embodiments, the groove 1820 is defined by a groove wall 1830 that surrounds most of the groove 1820, leaving only an entry space 1825 through which the cord can access the groove 1820. In some embodiments, the entry space 1825 has a smaller diameter than the groove 1820 and the cord, thereby securing the cord within the confines of the groove wall 1830 and requiring a significant amount of force for its removal. In some embodiments, portions of the groove wall 1830 are flexible so that as the cord is pushed through the entry space 1825, the cord is able to force the groove wall 1830 out of its way and temporarily increase the diameter of the entry space 1825 so that the cord can pass through the entry space 1825 into the groove 1820. In some embodiments, the groove wall 1830 is substantially rigid, thereby forcing the outer sleeve of the cord to constrict as it passes through the entry space 1825 between the ends of the groove wall 1830.

Figure 19A:
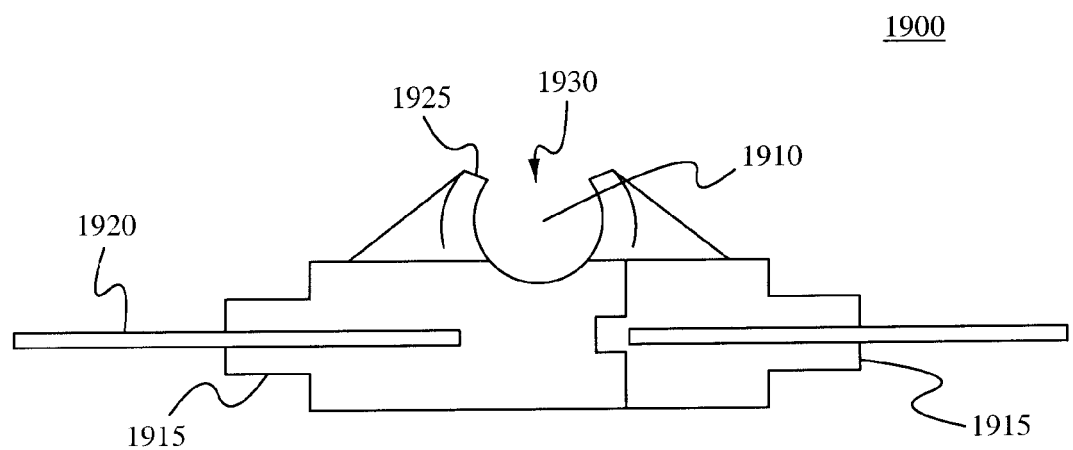
FIG. 19A illustrates a cross sectional view of a headset cord holder having a groove molded into the zipper teeth of a zipper in accordance with some embodiments of the present application.
Figure 19B:
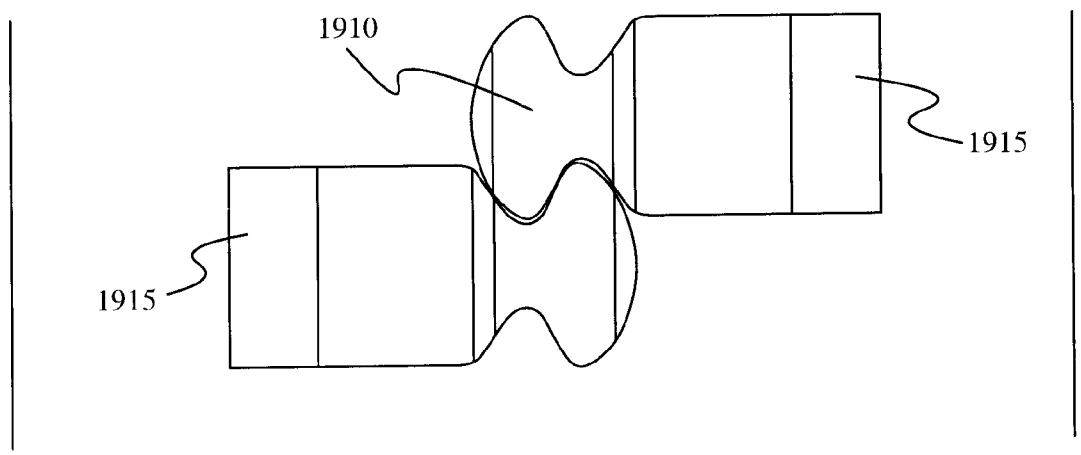
FIG. 19B illustrates an up-close front view of a headset cord holder having a groove molded in to the zipper teeth of a zipper in accordance with some embodiments of the present application.
Figure 19C:
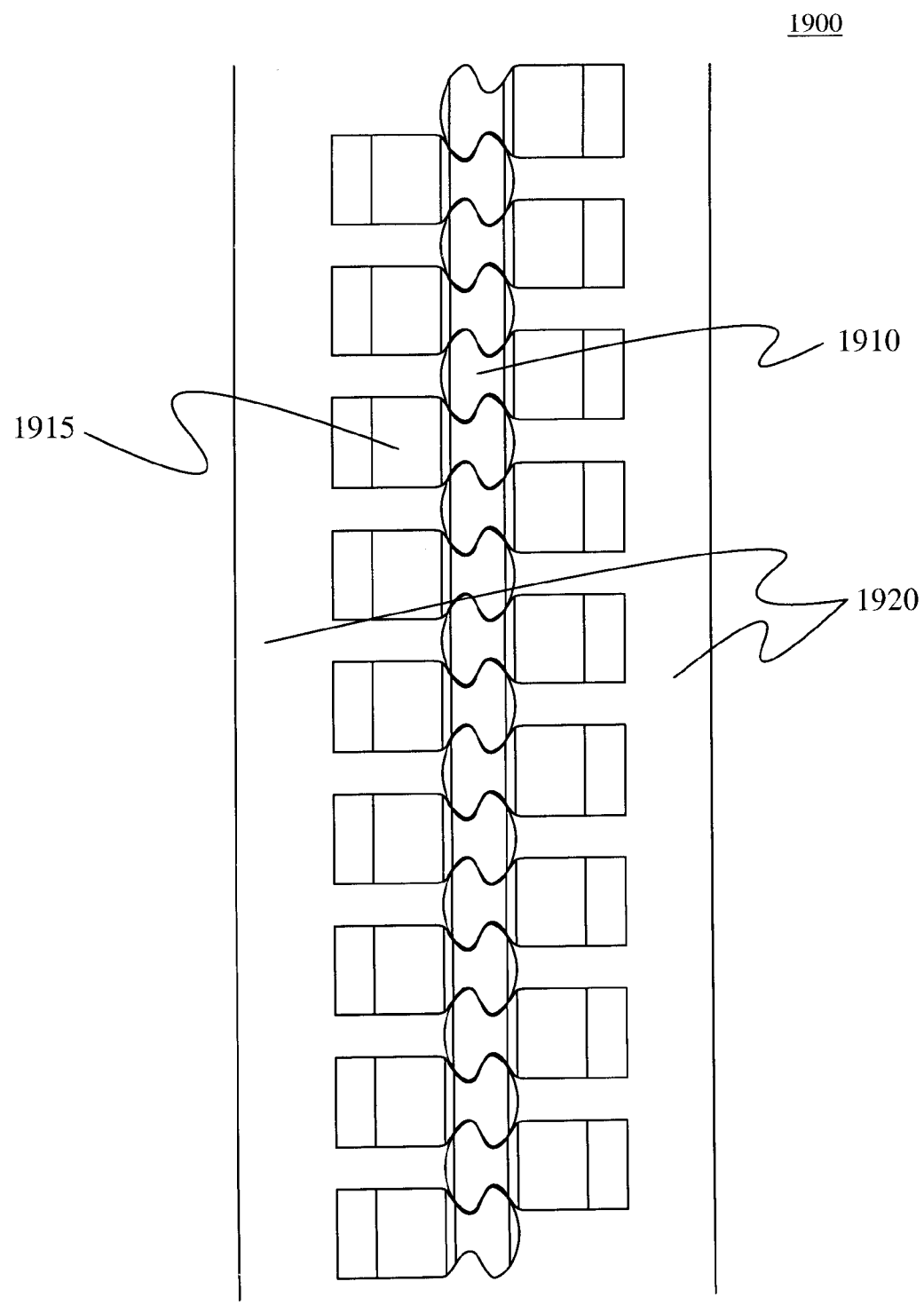
FIG. 19C illustrates a front view of a headset cord holder having a groove molded in to the zipper teeth of a zipper in accordance with some embodiments of the present application.
Figure 19E:
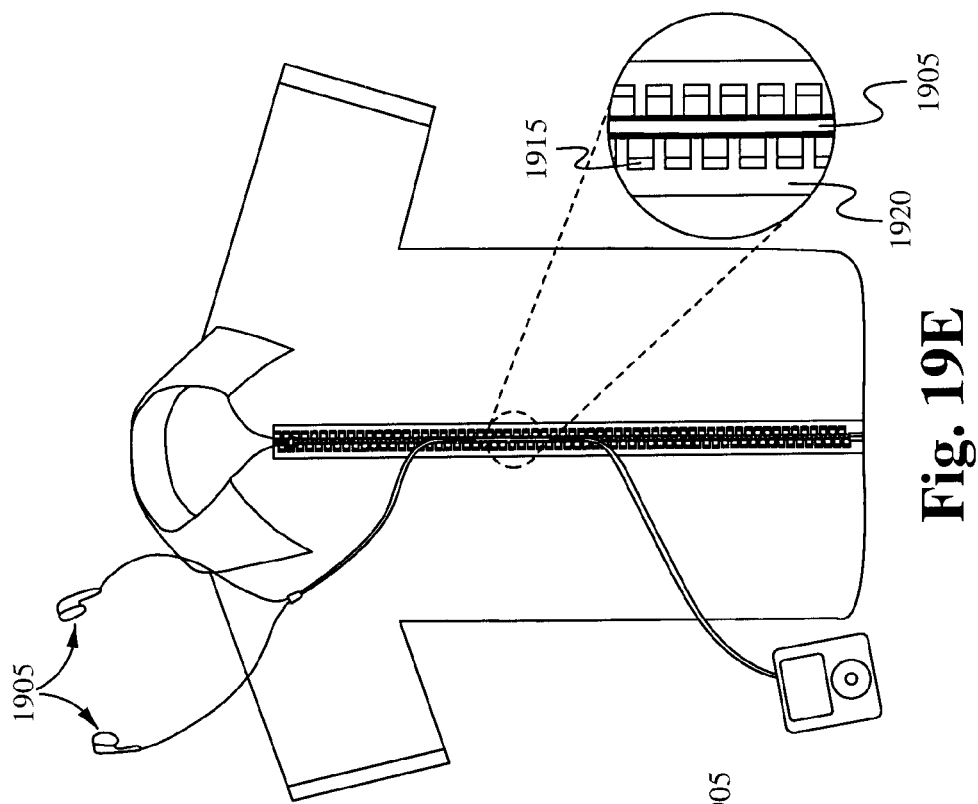
FIG. 19E illustrates a zipped perspective view of a headset cord holder having a groove molded in to the zipper teeth of a zipper in accordance with some embodiments of the present application.
Figure 19D:
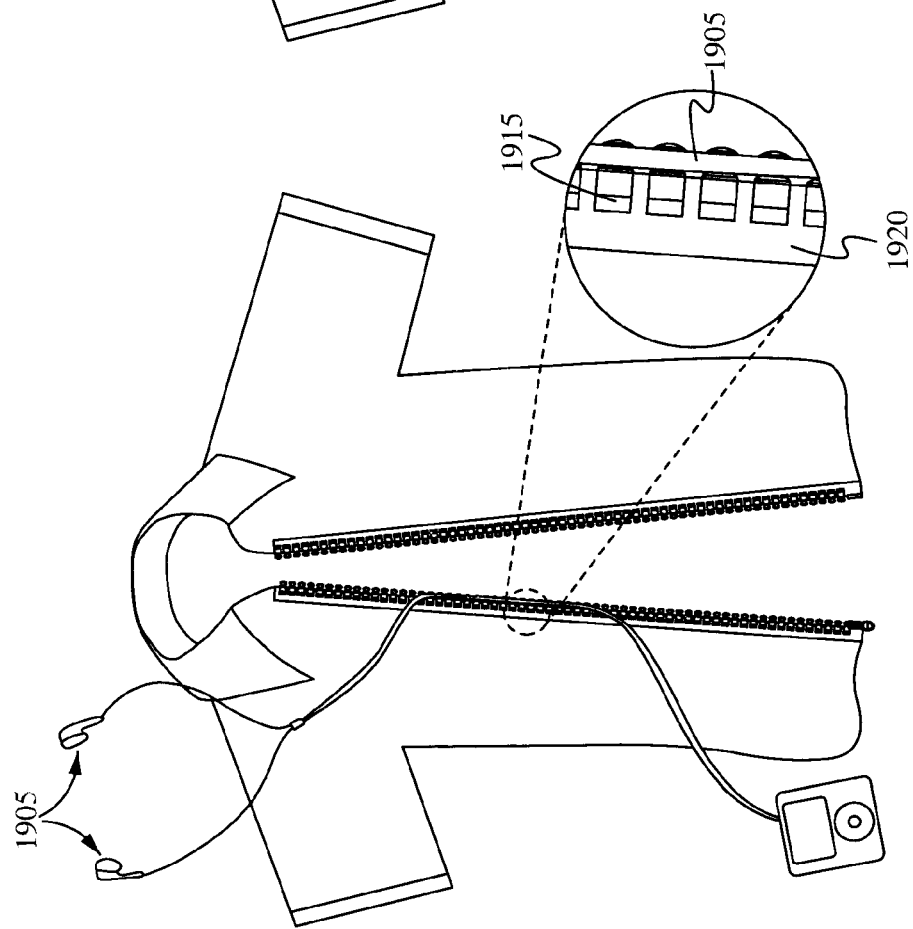
FIG. 19D illustrates an unzipped perspective view of a headset cord holder having a groove molded in to the zipper teeth of a zipper in accordance with some embodiments of the present application.

FIGS. 19A-E illustrate a headset cord holder 1900 in accordance with some embodiments of the present application. FIG. 19A illustrates a cross sectional view, FIG. 19B illustrates an up-close front view, FIG. 19C illustrates an expanded front view, FIG. 19D shows an unzipped perspective view, and FIG. 19E shows a zipped perspective view. The headset cord holder 1900 comprises a body having a groove 1910 molded or built into the body which is a zipper. Alternatively, the body is able to be any other type of interlocking fastener with a solid body. In some embodiments, the body is metal. Alternatively, the body is able to comprise any number and combination of materials including metal or plastic as is well known in the art. The zipper 1910 comprises a plurality of zipper teeth 1915, zipper tape 1920 and a zipper head (not shown). In some embodiments, the zipper head is substantially similar to the embodiments shown in FIGS. 14A and 14B. Alternatively, any type of zipper head is contemplated, including no zipper head. As is well known in the art, the zipper is configured to couple to clothing and other items via the zipper tape 1920. Alternatively, the zipper is configured to couple to clothing and/or other items via any other zipper attaching means as are well known in the art.

The groove 1910 is molded or otherwise built into the teeth 1915 of the zipper body. Specifically, each zipper tooth 1915 is configured such that the interlocking portion of the teeth 1915 comprises a portion of the groove 1910. As a result, the groove 1910 is fully formed when the zipper is "zipped up" such that the portions of the groove 1910 in each interlocking tooth line up forming the full groove 1910 as shown in FIGS. 19C and 19E. However, even if the zipper is not fully "zipped up," or even if the zipper is "unzipped", the groove 1910 is able to still operate because at least a portion of the groove 1910 is able to receive the headset cord 1905 as shown in FIG. 19D. In FIG. 19D, an "unzipped" zipper is shown receiving the headset cord 1905 as half of the zipper teeth 1915 are still lined up on either side of the zipper thereby creating two partial grooves 1910. In some embodiments, every tooth 1915 in the zipper comprises a portion of the groove 1910. Alternatively, only a portion of the zipper teeth 1915 comprise a portion of the groove 1910. In some embodiments, a first portion of the zipper teeth 1915 comprise a groove 1910 of a first diameter, and one or more second portions of the zipper teeth 1915 comprise grooves 1910 of different diameters. For example, the length of the zipper and thereby the zipper teeth 1915 is able to be divided into multiple subsections wherein each subsection comprises zipper teeth 1915 having a groove 1910 of a different diameter. As a result, different portions of the zipper are able to be used to couple cords 1905 of different diameters within the differently sized grooves 1910. Further, in some embodiments, each zipper tooth 1915 comprises more than one groove 1910 either with the same size diameter or different sizes.

The groove 1910 is configured to receive and releasably secure a headset cord 1905. In some embodiments, the groove 1910 is defined by a groove wall 1925 that surrounds most of the groove 1910, leaving only an entry space 1930 through which the cord 1905 is able to access the groove 1910 as shown in FIG. 19A. In some embodiments, the entry space 1930 has a smaller diameter than the groove 1910 and the cord 1905, thereby securing the cord 1905 within the confines of the groove wall 1925 and requiring a significant amount of force in order to remove the cord 1905 from the groove 1910. In some embodiments, portions of the groove wall 1925 are flexible such that, as the cord 1905 is pushed through the entry space 1930, the cord 1905 is able to force the groove wall 1925 out of its way thereby temporarily increasing the diameter of the entry space 1930 so that the cord 1905 is able to pass through the entry space 1930 into the groove 1910. Alternatively, the groove wall 1925 is substantially rigid such that the wall 1925 forces the cord 1905 to constrict as it passes through the entry space 1930 between the ends of the groove wall 1925.

In some embodiments, the grooves of the presently claimed invention have a diameter less than or equal to approximately 2 mm. In some embodiments, the grooves have a diameter less than or equal to approximately 1.5 mm. However, it is contemplated that a variety of groove sizes are within the scope of the presently claimed application. Furthermore, it is contemplated that multiple groove configurations are able to have a certain number of grooves of one size and a certain number of grooves of a different size in order to accommodate differently sized cords or different parts of the same cord.

In operation, a user places a headset cord within the confines of the groove wall while using the headset to listen to an electronic device. Specifically, a user aligns a headset cord with a headset cord holder groove described above and pushes the cord into the groove such that the narrow portion of the groove walls hold the cord in place. This enables a user to comfortably utilize the headset without becoming entangled within the cord. By doing so, the headset cord holder has the advantage of providing an inexpensive and easy way to hold a headset cord in a comfortable and convenient position while utilizing an electronic device. Accordingly, the headset cord holder described herein has numerous advantages.

The presently claimed invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

What is claimed is:

1. A headset cord holder comprising:
   a. a plurality of zipper teeth each having a body; and
   b. a first groove built into one or more of the bodies configured to receive and releasably hold a cord, wherein the groove is offset from an edge of a portion of zipper tape and further wherein the first groove within each body is aligned when the zipper teeth are interlocked adjacently to one another to form an uninterrupted groove throughout the adjacently interlocked teeth to receive and releasably hold the cord.

2. The headset cord holder of claim 1, wherein the first groove has a diameter less than or equal to approximately 2 mm.

3. The headset cord holder of claim 1, wherein each body comprises one or more of rubber, plastic or metal.

4. The headset cord holder of claim 1, wherein each body comprises one or more of stamped metal or molded metal.

5. The headset cord holder of claim 1, wherein each body comprises molded plastic.

6. The headset cord holder of claim 1, wherein each body comprises one or more additional grooves configured to receive and releasably secure the headset cord.

7. The headset cord holder of claim 6, wherein the one or more additional grooves each have a different diameter.

8. The headset cord holder of claim 1, wherein the teeth comprise a first portion and a second portion, wherein each first body of the first portion has a first groove of a first diameter and each second body of the second portion has a second groove of a second diameter.

9. A headset cord holder comprising:
   a. a plurality of zipper teeth each having a body, together forming at least a portion of a zipper, and
   b. a first groove built into one or more of the bodies configured to receive and releasably hold a cord;
   wherein the first groove within each body is aligned when the zipper teeth are interlocked adjacently to one another to form an uninterrupted groove throughout the adjacently interlocked teeth to receive and releasably hold the cord.

10. The headset cord holder of claim 9, wherein the first groove has a diameter less than or equal to approximately 2 mm.

11. The headset cord holder of claim 9, wherein each body comprises one or more of rubber, plastic or metal.

12. The headset cord holder of claim 9, wherein each body comprises one or more of stamped metal or molded metal.

13. The headset cord holder of claim 9, wherein each body comprises molded plastic.

14. The headset cord holder of claim 9, wherein each body comprises one or more additional grooves configured to receive and releasably secure the headset cord.

15. The headset cord holder of claim 14, wherein the one or more additional grooves each have a different diameter.

16. The headset cord holder of claim 9, wherein the teeth comprise a first portion and a second portion, wherein each first body of the first portion has a first groove of a first diameter and each second body of the second portion has a second groove of a second diameter.

17. A headset cord holder comprising:
   a. a plurality of zipper teeth each having a body, together forming at least a portion of a zipper, and
   b. a first groove built into one or more of the bodies configured to receive and releasably hold a cord;
   wherein the first groove within each body is aligned when the zipper teeth are interlocked adjacently to one another to form an uninterrupted groove throughout the adjacently interlocked teeth to receive and releasably hold the cord, and the first groove within every other body is aligned when the zipper teeth are not interlocked adjacently to one another.

18. The headset cord holder of claim 17, wherein the first groove has a diameter less than or equal to approximately 2 mm.

19. The headset cord holder of claim 17, wherein each body comprises one or more of rubber, plastic or metal.

20. The headset cord holder of claim 17, wherein each body comprises one or more of stamped metal or molded metal.

21. The headset cord holder of claim 17, wherein each body comprises molded plastic.

22. The headset cord holder of claim 17, wherein each body comprises one or more additional grooves configured to receive and releasably secure the headset cord.

23. The headset cord holder of claim 22, wherein the one or more additional grooves each have a different diameter.

24. The headset cord holder of claim 17, wherein the teeth comprise a first portion and a second portion, wherein each first body of the first portion has a first groove of a first diameter and each second body of the second portion has a second groove of a second diameter.

* * * * *